United States Patent
Poole

(10) Patent No.: US 10,345,468 B2
(45) Date of Patent: Jul. 9, 2019

(54) SYSTEM AND METHOD FOR SEISMIC DATA PROCESSING OF SEISMIC DATA SETS WITH DIFFERENT SPATIAL SAMPLING AND TEMPORAL BANDWIDTHS

(71) Applicant: CGG SERVICES SA, Massy (FR)

(72) Inventor: Gordon Poole, East Grinstead (GB)

(73) Assignee: CGG SERVICES SAS, Massy (FR)

( * ) Notice: Subject to any disclaimer, the term of this patent is extended or adjusted under 35 U.S.C. 154(b) by 365 days.

(21) Appl. No.: 15/114,551

(22) PCT Filed: Jan. 20, 2015

(86) PCT No.: PCT/IB2015/000261
§ 371 (c)(1),
(2) Date: Jul. 27, 2016

(87) PCT Pub. No.: WO2015/118409
PCT Pub. Date: Aug. 13, 2015

(65) Prior Publication Data
US 2016/0341836 A1   Nov. 24, 2016

Related U.S. Application Data

(60) Provisional application No. 61/937,631, filed on Feb. 10, 2014.

(51) Int. Cl.
*G01V 1/36* (2006.01)
*G01V 1/28* (2006.01)

(52) U.S. Cl.
CPC .............. *G01V 1/36* (2013.01); *G01V 1/28* (2013.01); *G01V 2210/127* (2013.01); *G01V 2210/57* (2013.01)

(58) Field of Classification Search
CPC ...... G01V 1/36; G01V 1/28; G01V 2210/127; G01V 2210/57
See application file for complete search history.

(56) References Cited

U.S. PATENT DOCUMENTS

| | | | |
|---|---|---|---|
| 6,876,599 B1* | 4/2005 | Combee | G01V 1/364 367/20 |
| 2008/0189043 A1 | 8/2008 | Anno et al. | |
| 2012/0155217 A1* | 6/2012 | Dellinger | G01V 1/005 367/38 |
| 2013/0333974 A1 | 12/2013 | Coste et al. | |
| 2015/0120200 A1* | 4/2015 | Brenders | G01V 1/005 702/18 |

(Continued)

OTHER PUBLICATIONS

Office Action in corresponding European Application No. 15 720 399.3 dated Dec. 5, 2017. (All references not cited herewith have been previously made of record.).

(Continued)

*Primary Examiner* — Sujoy K Kundu
*Assistant Examiner* — Lynda Dinh
(74) *Attorney, Agent, or Firm* — Patent Portfolio Builders PLLC

(57) ABSTRACT

Computing device and methods process seismic data sets associated with the same surveyed subsurface but recorded with different spatial sampling and temporal bandwidths. The first seismic data is used to guide processing of the second seismic data. An image of the subsurface is generated based on processed second seismic data.

20 Claims, 22 Drawing Sheets

(56) References Cited

U.S. PATENT DOCUMENTS

2015/0142831 A1    5/2015    Clement et al.

OTHER PUBLICATIONS

Office Action in European Application No. 15 720 3993 dated Jul. 11, 2018. (All references not cited herewith have been previously made of record.).
International Search Report in related International Application No. PCT/IB2015/000261, dated Oct. 13, 2015.
Written Opinion of the International Searching Authority in related International Application No. PCT/IB2015/000261, dated Oct. 13, 2015.
G. Hennenfent et al., "Sparseness-Constrained Data Continuation with Frames: Applications to Missing Traces and Aliased Signals in 2/3-D", SEG Annual Meeting, Houston, Texas, 2005, pp. 2162-2166.
P. Herrmann et al., "De-Aliased, High-Resolution Radon Transforms", SEG Expanded Abstracts, 2000.
P. Hugonnet et al., "Beyond Aliasing Regularization by Plane Event Extraction", EAGE 69th Conference & Exhibition, London, UK, Jun. 11-14, 2007.
P. Hugonnet et al., "High Resolution 3D Parabolic Radon Filtering", SEG Annual Meeting, Las Vegas, Nevada, 2008, pp. 2492-2496.
M. Naghizadeh et al., "Beyond Alias Hierarchical Scale Curvelet Interpolation of Regularly and Irregularly Sampled Seismic Data", Geophysics, Nov.-Dec. 2010, vol. 75, No. 6, pp. WB189-WB202.
M. Schonewille et al., "Anti-Alias Anti-Leakage Fourier Transform", SEG International Exposition and Annual Meeting, Houston, Texas, 2009, pp. 3249-3253.
S. Spitz, "Seismic Trace Interpolation in the F-X Domain", Geophysics, Jun. 1991, vol. 56, No. 6, pp. 785-794.
D. Trad, "Five-Dimensional Interpolation: Recovering from Acquisition Constraints", Geophysics, Nov.-Dec. 2009, vol. 74, No. 6, pp. V123-V132.
D. Trad et al., "Latest Views of the Sparse Radon Transform", Geophysics, Jan.-Feb. 2003, vol. 68, No. 1, pp. 286-399.
E. Verschuur, "Seismic Multiple Removal Techniques: Past, Present and Future", 2006 EAGE Education Tour, Oct. 17, 2006, Eni Corporate University, Italy.
S. Xu et al., "Antileakage Fourier Transform for Seismic Data Regularization in Higher Dimensions", Geophysics, Nov.-Dec. 2010, vol. 75, No. 6, pp. WB113-WB120.
Y. Zhang et al., "A Stable and Practical Implementation of Least-Squares Reverse Time Migration", SEG Annual Meeting, Houston, Texas, 2013, pp. 3716-3720.
A. Ziolkowski et al., "The Signature of an Air Gun Array: Computation from Near-Field Measurements Including Interactions", Geophysics, Oct. 1982, vol. 47, No. 10, pp. 1413-1421.

\* cited by examiner

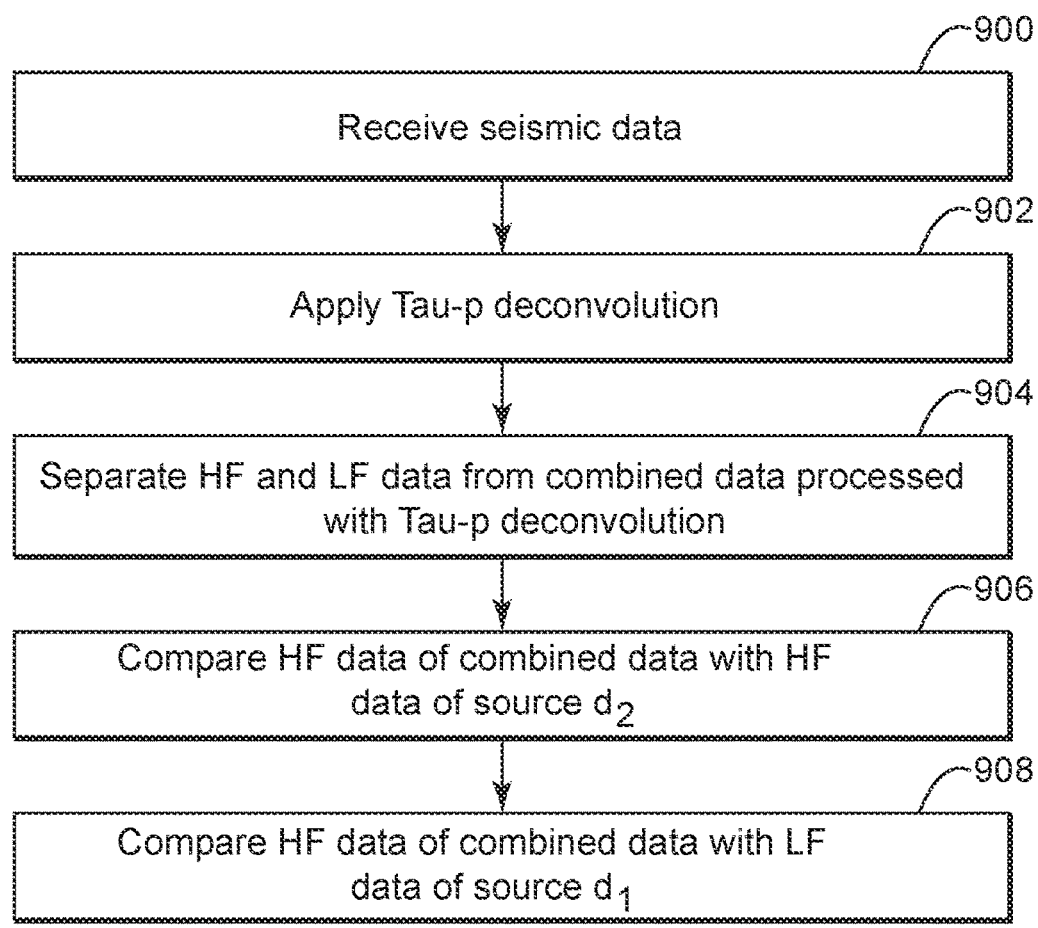

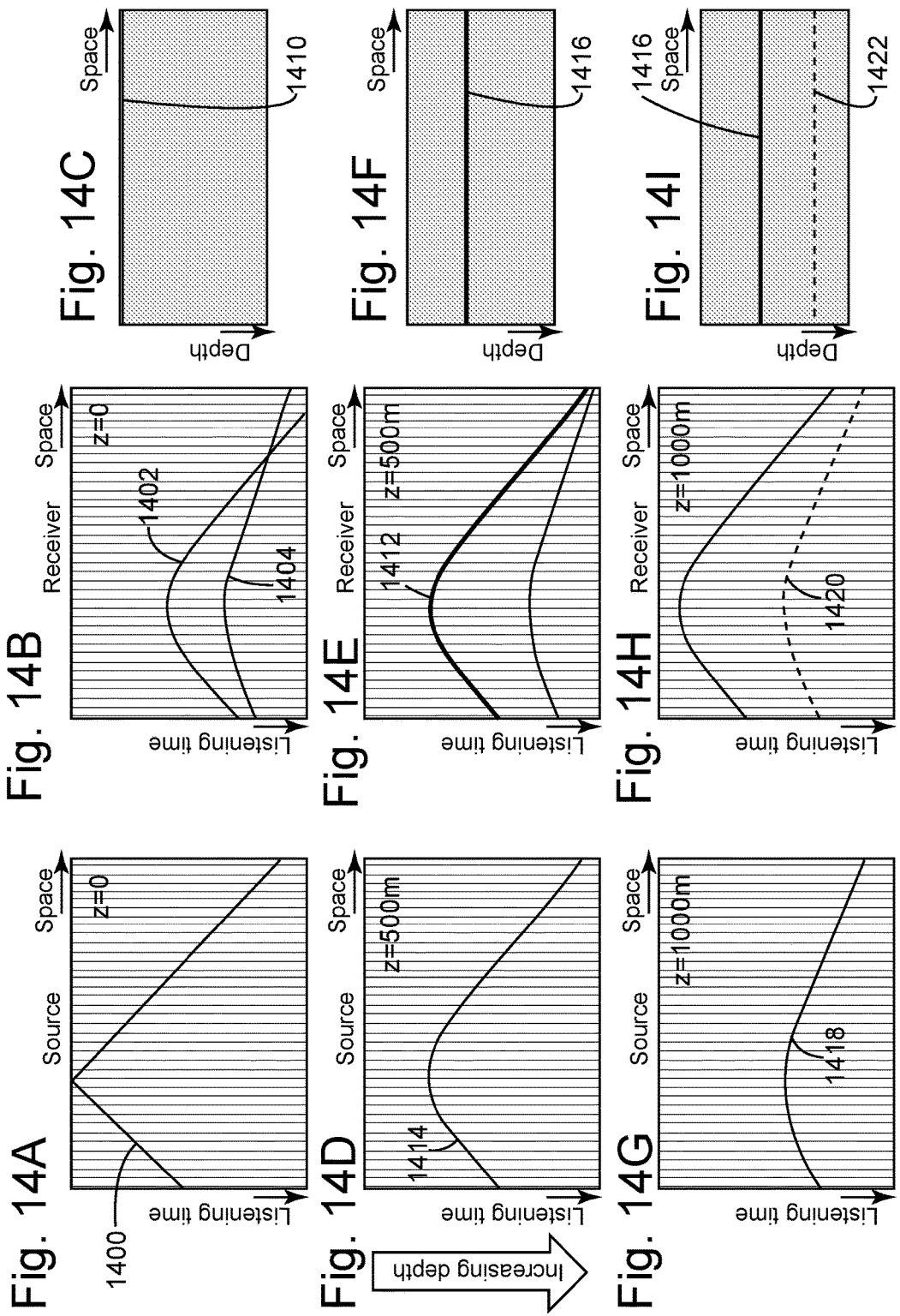

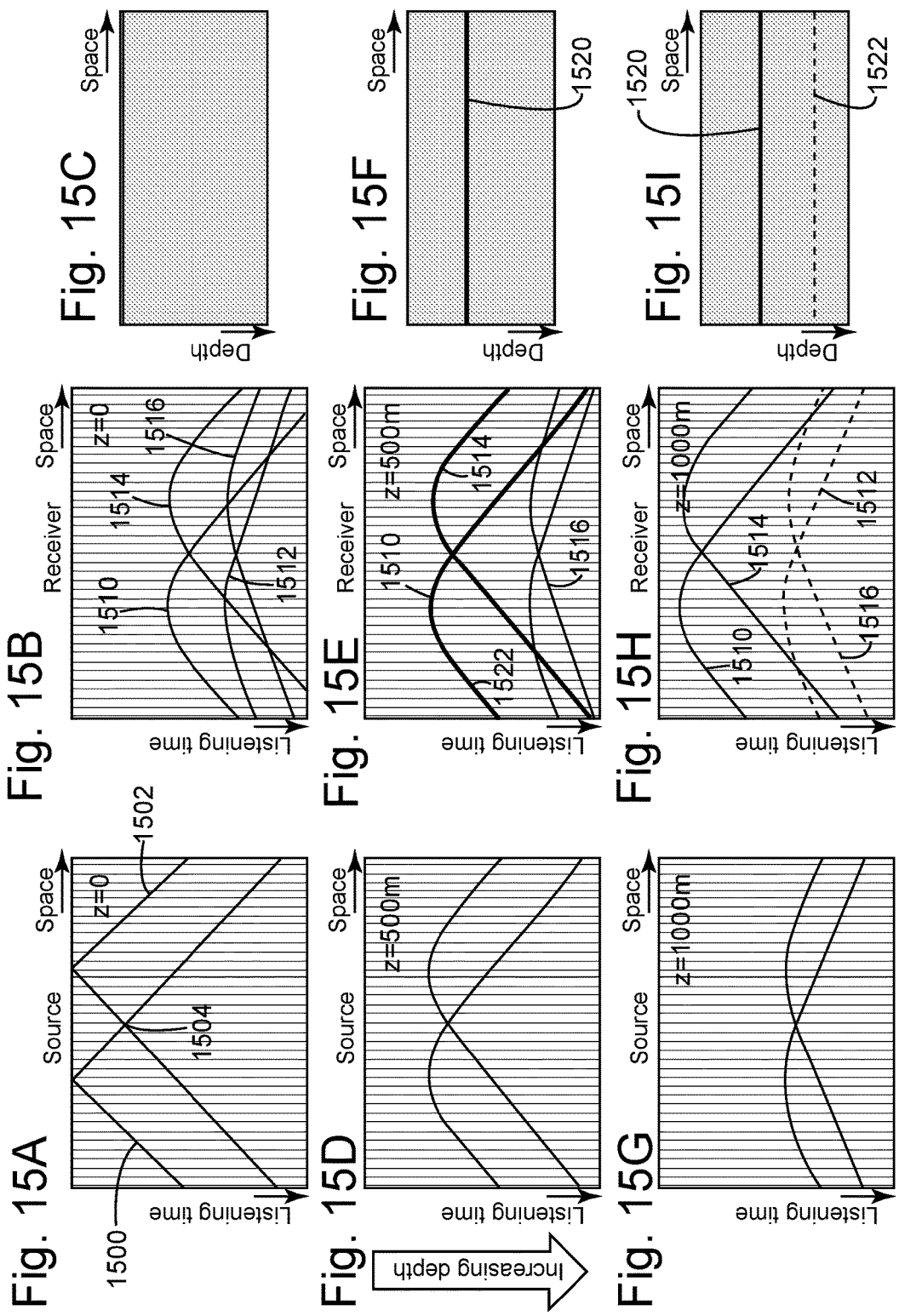

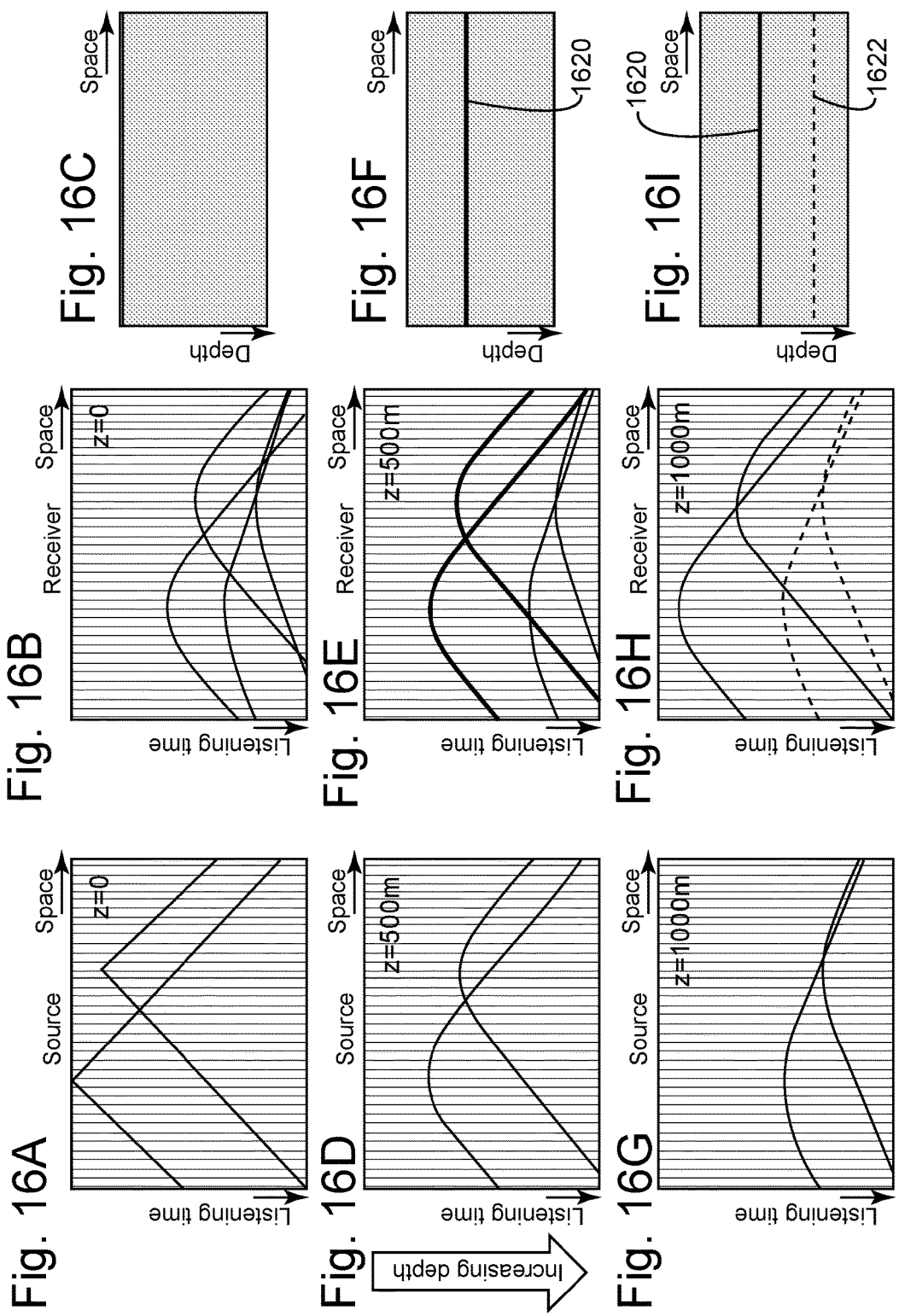

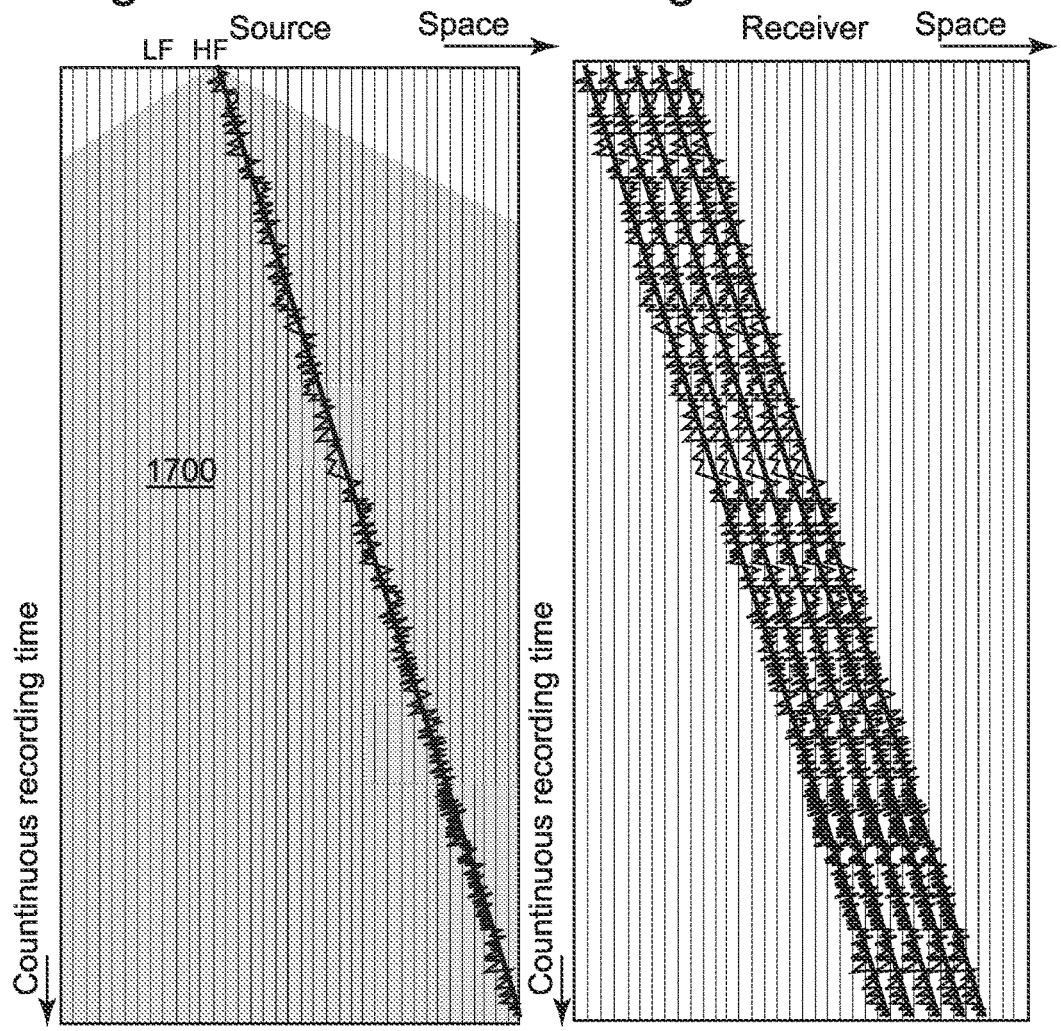

SYSTEM AND METHOD FOR SEISMIC DATA PROCESSING OF SEISMIC DATA SETS WITH DIFFERENT SPATIAL SAMPLING AND TEMPORAL BANDWIDTHS

CROSS REFERENCE TO RELATED APPLICATIONS

The present application claims the benefit of priority under 35 U.S.C. § 119(e) to U.S. Provisional Application No. 61/937,631 filed on Feb. 10, 2014, the entire contents of which is hereby incorporated by reference.

BACKGROUND

Technical Field

Embodiments of the subject matter disclosed herein generally relate to methods and systems and, more particularly, to mechanisms and techniques for processing seismic data sets that are recorded with different spatial sampling and different temporal bandwidths.

Discussion of the Background

Reflection seismology is a method of geophysical exploration to determine the properties of a portion of a subsurface layer in the earth, information that is especially helpful in the oil and gas industry. Marine reflection seismology is based on the use of a controlled source that sends energy waves into the earth. By measuring the time it takes for the reflections to come back to plural receivers, it is possible to estimate the depth and/or composition of the features causing such reflections. These features may be associated with subterranean hydrocarbon deposits.

For marine applications, a seismic survey system 100, as illustrated in FIG. 1, includes a vessel 102 that tows plural streamers 110 (only one is visible in the figure) and a seismic source array 130. Streamer 110 is attached through a lead-in cable (or other cables) 112 to vessel 102, while source array 130 is attached through an umbilical 132 to the vessel. A head float 114, which floats at the water surface 104, is connected through a cable 116 to the head end 110A of streamer 110, while a tail buoy 118 is connected, through a similar cable 116, to the tail end 110B of streamer 110. Head float 114 and tail buoy 118 are used, among other things, to maintain the streamer's depth. Seismic sensors 122 are distributed along the streamer and configured to record seismic data. Seismic sensors 122 may include a hydrophone, geophone, accelerometer or a combination thereof. Positioning devices 128 are attached along the streamer and controlled by a controller 126 for adjusting a position of the streamer according to a survey plan.

Source array 130 has plural source elements 136, which are typically air guns. The source elements are attached to a float 137 to travel at desired depths below the water surface 104. During operation, vessel 102 follows a predetermined path T while source elements (usually air guns) 136 emit seismic waves 140. These waves bounce off the ocean bottom 142 and other layer interfaces below the ocean bottom 142 and propagate as reflected/refracted waves 144, which are recorded by sensors 122. The positions of both source elements 136 and recording sensors 122 may be estimated based on GPS systems 124 and recorded together with the seismic data in a storage device 127 onboard the vessel. Controller 126 has access to the seismic data and may be used to achieve quality control or even fully process the data. Controller 126 may also be connected to the vessel's navigation system and other elements of the seismic survey system, e.g., positioning devices 128.

Alternatively, the seismic data may be collected in a land environment as illustrated in FIG. 2. According to this scenario, a seismic acquisition system 200 includes plural receivers 202 positioned over an area 204 of a subsurface to be explored and in contact with, or below the surface 206 of, the ground. A number of dedicated seismic sources 208 are also placed on the surface 206 in an area 210, in a vicinity of the area 204 of the receivers 202. Note that a dedicated seismic source is defined as a device built by man with the main purpose of generating seismic waves to be used for a seismic survey. Alternatively, dedicated seismic sources 208 may be buried under surface 206. A central recording device 212 is connected to the plurality of receivers 202 and placed, for example, in a station/truck 214. Each dedicated seismic source 208 can be composed of a variable number of vibrators, typically between one and five, and can include a local controller 216. A central controller 218 can be provided to coordinate the shooting times of sources 208. A global positioning system (GPS) 220 can be used to time-correlate shooting of the dedicated seismic sources 208 and the recordings of the receivers 202. With this configuration, dedicated seismic sources 208 are controlled to intentionally generate seismic waves, and the plurality of receivers 202 records waves reflected by oil and/or gas reservoirs and other structures.

Both in the land and marine seismic acquisition data, there are cases when two different sets of seismic data are acquired over the same desired subsurface. These two sets of seismic data are combined when generating an image of the subsurface. Traditionally, the data combination is possible because the two sets of seismic data are acquired to have the same spatial sampling, i.e., the data is recorded at the same locations, as schematically illustrated in FIG. 3A, where the first set of seismic data 300 is represented by circles and the second set of seismic data 302 is represented by crosses. Note that parameters 1 and 2 on the X and Y axes in FIG. 3A may be any of the x, y and z coordinates. However, it is possible that two sets of seismic data 310 and 312 have a different spatial sampling, as illustrated in FIG. 3B. If this is the case, existing seismic processing methods and algorithms are not capable of combining the two sets of seismic data. If the two seismic data sets further have different temporal bandwidths, in addition to different spatial sampling, then most traditional algorithms are not capable of processing this data.

Thus, there is a need to develop new algorithms and methods for processing seismic data sets having different spatial sampling and different temporal bandwidths.

SUMMARY

According to one embodiment, there is a method for processing seismic data associated with a surveyed subsurface. The method includes a step of receiving at least first and second seismic data sets that were recorded with different spatial sampling and different temporal bandwidths; a step of using the first seismic data to guide a processing of the second seismic data; and a step of generating an image of the subsurface based on processed second seismic data.

According to another embodiment, there is a computing device for processing seismic data associated with a surveyed subsurface. The computing device includes an interface configured to receive at least first and second seismic data sets that were recorded with different spatial sampling and different temporal bandwidths and a processor connected to the interface. The processor is configured to use the first seismic data to guide a processing of the second seismic data, and generate an image of the subsurface based on processed second seismic data.

According to still another embodiment, there is a method for processing seismic data associated with a surveyed subsurface. The method includes a step of receiving at least first and second seismic data sets that were recorded with different spatial sampling and different temporal bandwidths; interpolating the first seismic data to obtain interpolated first seismic data; combining the interpolated first seismic data with the second seismic data; and generating an image of the subsurface based on a combination of the interpolated first seismic data with the second seismic data.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 9 is a flowchart of a method for applying gapping deconvolution;

FIGS. 14A-I schematically illustrate a wave-equation migration process using two data sets of different spatial sampling and a single source;

FIGS. 15A-I schematically illustrate a wave-equation migration process using two data sets of different spatial sampling and two sources simultaneously excited;

FIGS. 16A-I schematically illustrate a wave-equation migration process using two data sets of different spatial sampling and two sources excited with a time delay;

FIGS. 17A-B illustrate source and receiver data, respectively, in the case of a moving source emitting energy continuously or semi-continuously;

DETAILED DESCRIPTION

Figure 1:
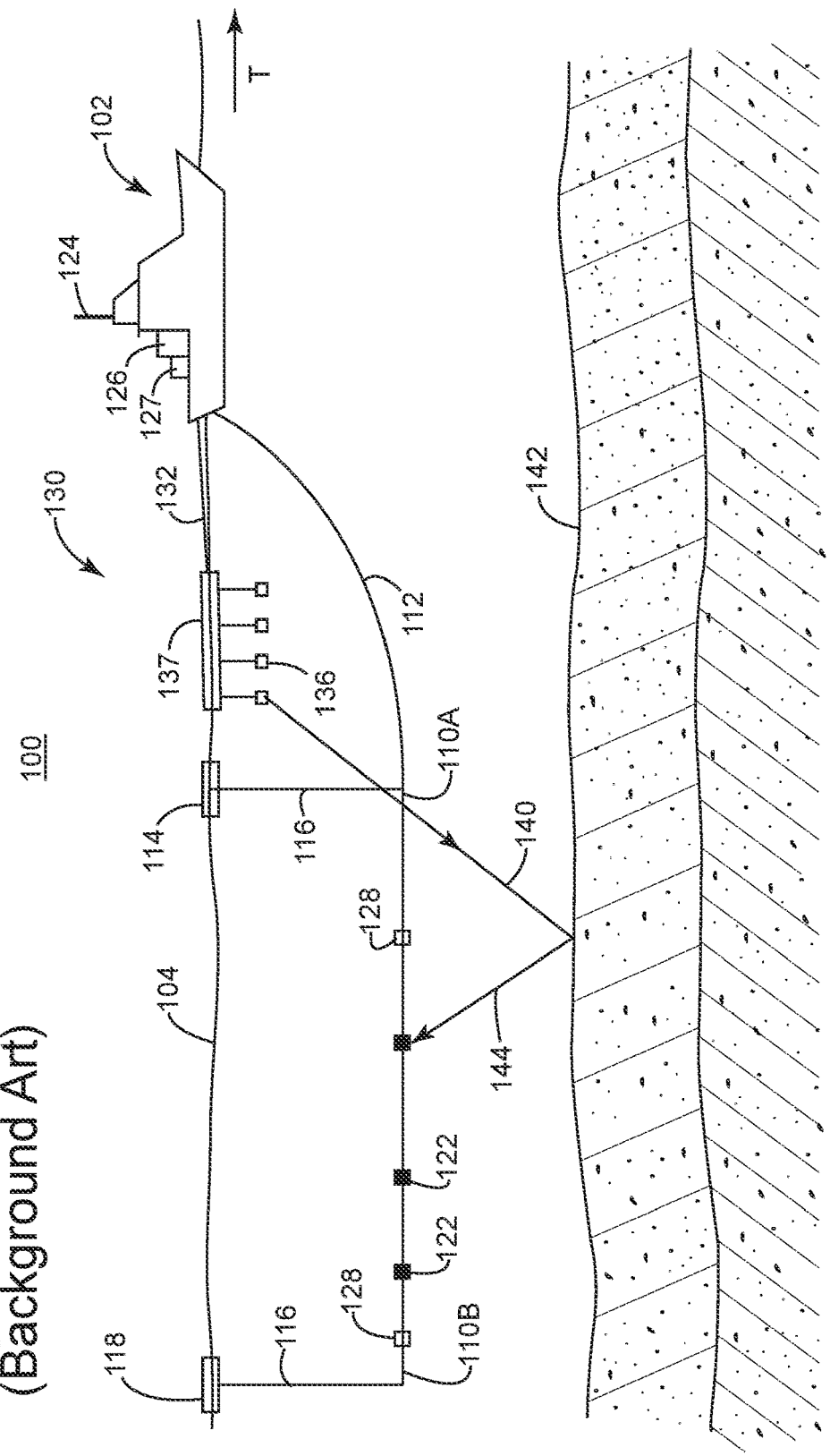
FIG. 1 is a schematic diagram of a marine seismic acquisition system.
Figure 2:
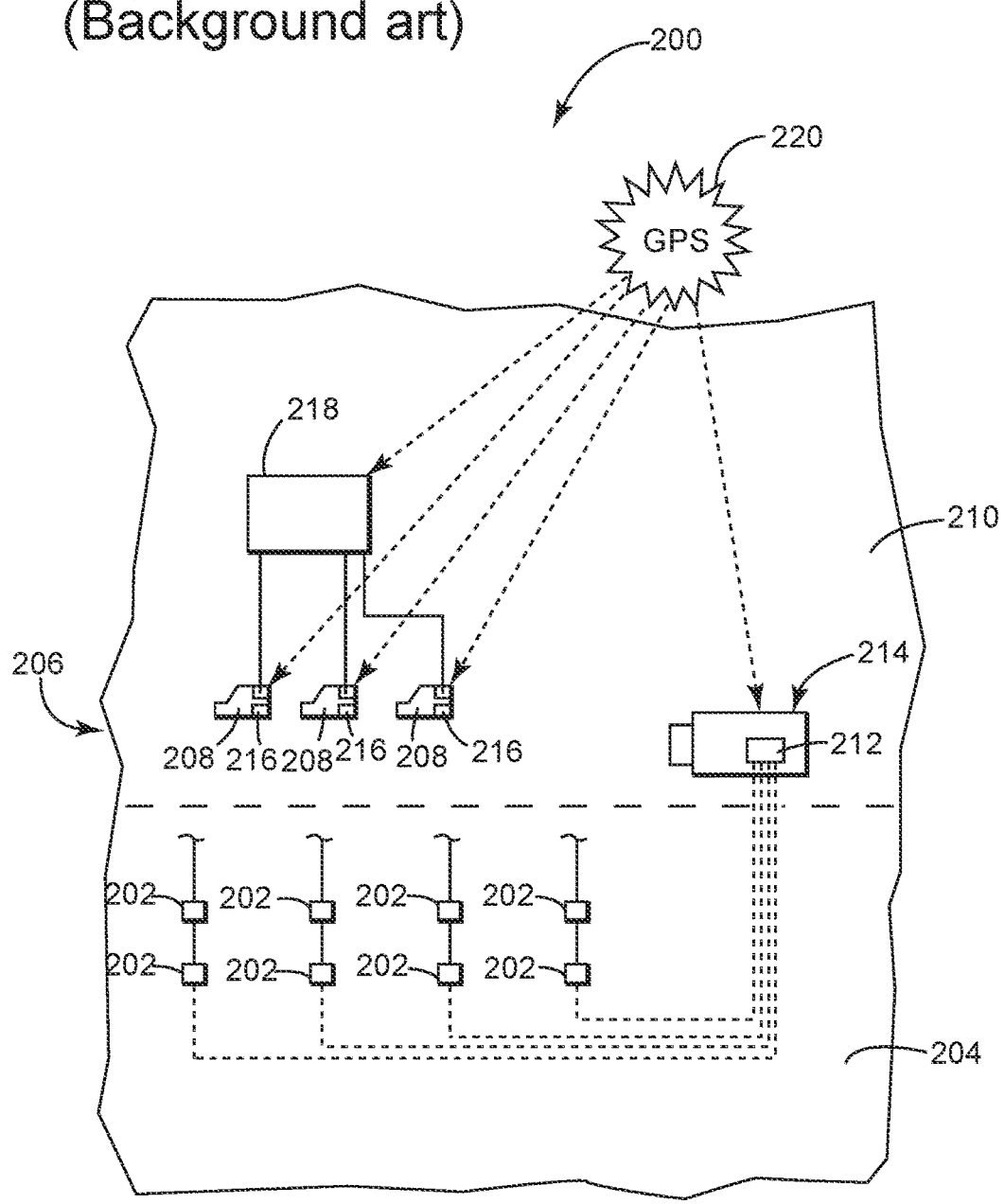
FIG. 2 is a schematic diagram of a land seismic acquisition system.
Figure 3A:
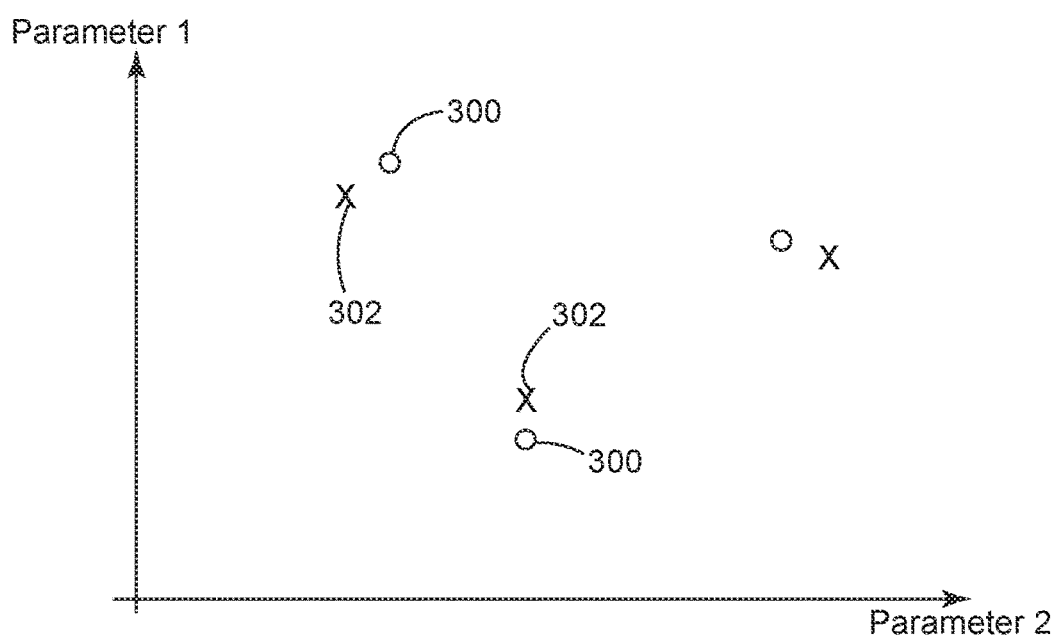
FIG. 3A schematically illustrates two data sets having the same spatial sampling.
Figure 3B:
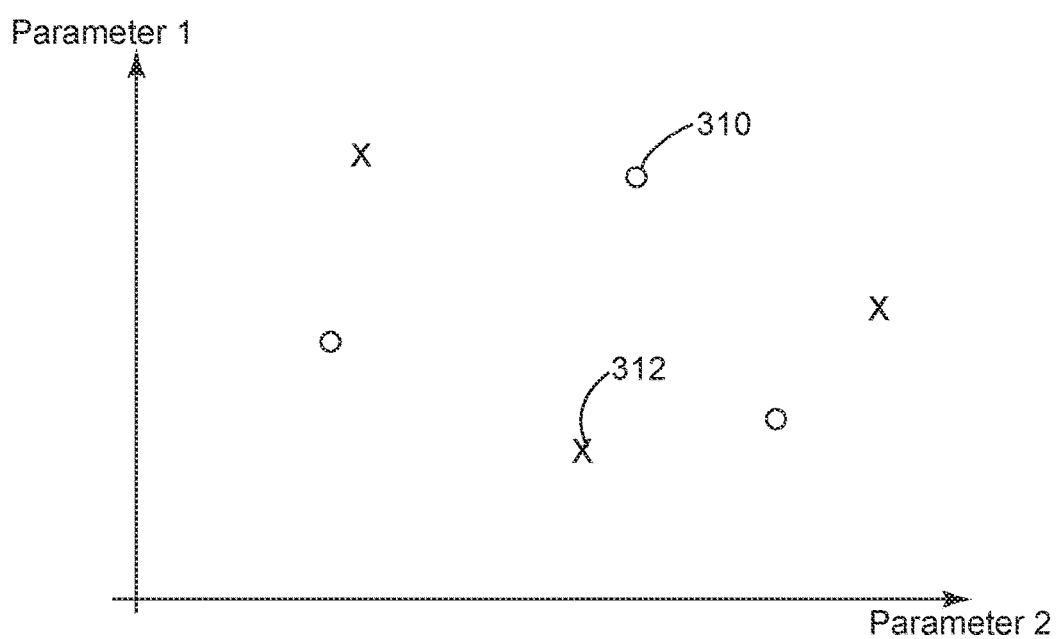
FIG. 3B schematically illustrates two data sets having different spatial sampling.

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to two seismic data sets, one having a high-frequency content and the second one having a low-frequency content. However, the embodiments to be discussed next are not limited to two seismic data sets or to high- and low-frequency seismic data sets; the methods discussed herein can be applied to any number of seismic data sets and/or to other types of data sets as long as they have different spatial sampling and different temporal bandwidths, where by different temporal bandwidth it is understood that there can be some overlap in temporal bandwidth as long at the energy from the sources is separated, for example, if different pseudo-random signals are used for each source or if pseudo-orthogonal sequences are used.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a method for processing seismic data associated with a surveyed subsurface includes a step of receiving at least first and second seismic data sets that were recorded with different spatial sampling and different temporal bandwidths, a step of processing the second seismic data based on the first seismic data, and a step of generating an image of the subsurface based on the first and second seismic data.

More specifically, according to an embodiment, it is desired to process at least two seismic data sets 310 and 312 with different bandwidths (e.g., low-frequency LF, and high-frequency HF) which also have different spatial sampling. Note that data bandwidth may also be a function of the source and/or receiver group array and environment near the source/receiver, in particular, the free surface ghost in marine acquisition. In the marine context, the free surface ghost amplifies energy at some frequencies and attenuates energy at other frequencies. The difference in temporal bandwidth may be a function of frequencies being emitted but also the depth of the source. The term "different spatial sampling" means that the two seismic data sets are not co-located in at least one of the x-coordinate, y-coordinate or z-coordinate for either the source and/or the receiver. Thus, in the following embodiments, these two seismic data sets are considered for exemplifying the various methods and processes. As noted above, the methods and processes to be discussed next can be applied to more than two seismic data sets.

Examples of physical scenarios where such seismic data sets may be acquired are:

(i) receivers which vary in sensitivity to different frequencies. For example, after a seismic source is fired, the energy is detected in a number of receivers. Some receivers may have been designed or configured to be sensitive to low frequencies, while other receivers may have been designed or configured to be sensitive to high frequencies.

(ii) sources emitting different frequencies. For example, two or more seismic sources are activated. The generated energy may or may not interfere. A first source is configured to emit high frequencies, while a second source (often in close proximity to the high frequency source) is configured to emit low frequencies.

(iii) a four-dimensional (4D) seismic survey. A first survey has used one type of seismic sensors, while a second survey, later in time, has used a different type of seismic sensors, located at different positions from the first survey. The duration between the two surveys may or may not include any detected or anticipated change in the data due to extracted hydrocarbons.

The datasets may include a combination of sources emitting different bandwidths and receivers designed to have sensitivity to different bandwidths.

These and other examples may include land or marine vibrator acquisition with low- and/or high-frequency sources. The acquisition may use single vibrators or vibrator arrays. The sources may be stationary or moving while emitting energy. The sources may emit energy with linear sweeps, step sweeps, band-limited pseudo-random sweeps, pseudo-orthogonal sequences or any other type of signal. In the case of simultaneous shooting, the energy from the sources may have been separated by deblending.

The following discussion may relate to land, marine (e.g., ocean bottom survey, towed streamer), or transition zone data. The receivers may be hydrophones, accelerometers, differential pressure sensors, geophones, or other sensors configured to detect seismic energy. Seismic sources may be air guns, dynamite, land vibroseis, marine vibrators, weight drop, pingers, boomers, or other seismic sources. The source may include an array of elements. Source array elements may emit energy in a synchronized way or desynchronized (e.g., "popcorn source"). A combination of source types may be used. The sources may be excited independently (without overlap of recorded energy), or simultaneously (blended acquisition). In the case of blended acquisition, the energy may have been deblended. For vibrator acquisition (marine or land), multiple sources using different pseudo-random or pseudo-orthogonal signals may be used to help source separation. The data may be before or after source designature.

Figure 4:
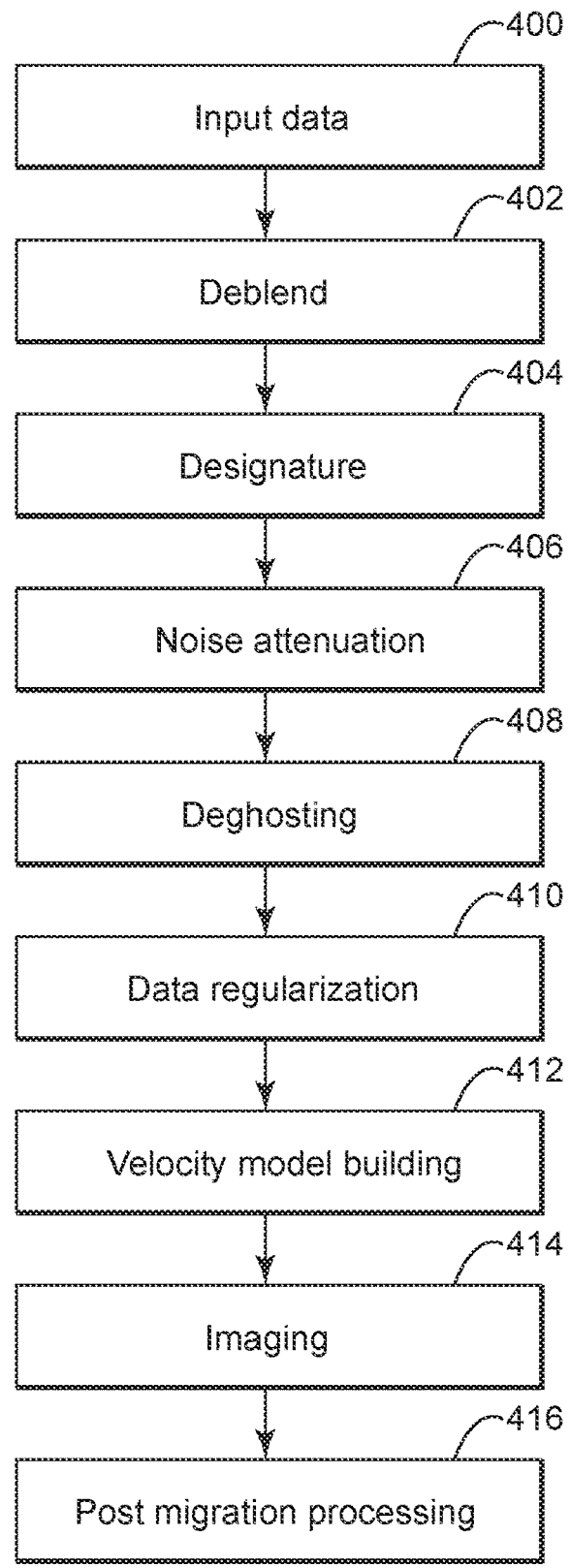
FIG. 4 is a flowchart of a method for seismic processing that combines two seismic data sets having the same spatial sampling.

FIG. 4 illustrates a processing method for determining an image of the surveyed subsurface based on the two seismic data sets 300 and 302. Note that FIG. 4 and associated description assumes that the two data sets 300 and 302 have the same spatial sampling. The method starts with step 400, in which the two seismic data sets (or more) are input and merged (optionally) with navigation information. In step 402, the seismic data sets may be deblended if they were recorded with a simultaneous shooting method. In step 404, a designature method may be applied, i.e., converting a known source signature used in acquisition to a desired signature. The designature method may be applied as per conventional data, either based on vertical take-off or using directionality. It may be applied in combination with deblending in the case of simultaneous shooting.

In step 406, one or more noise attenuation techniques may be applied to remove incoherent (random) or coherent noise. Random noise attenuation may include swell noise attenuation. One technique may use frequency-space (FX) deconvolution. This technique works on frequency slices, and it can be applied to LF and HF data independently or on blended data. Another technique is FX projection filtering. It works on frequency slices, and it can also be applied to LF and HF data independently or on blended data. Still another technique is time-domain prediction filtering. It can be applied to LF and HF data independently or on blended data. Filters derived on the LF data may be used to constrain filters to be applied to HF data. Another technique is common reflection surface denoise (CRS). The kinematics for this technique may be derived on LF and/or HF data and used to denoise LF and/or HF data. Another technique is the impulsive denoise. Often this step consists of defining noise to be attenuated, and then reconstructing the energy from surrounding unaffected data. Normally the reconstruction works on frequency slices and may be applied to LF and HF independently. Rank reduction filtering is another technique for random noise attenuation. It normally works on frequency slices, and it may be applied to LF and HF data independently. Another random noise attenuation technique is dip filtering. A dip estimate may be derived on the LF data and used to denoise the HF data. Note that all the techniques and/or methods that are known in the art by those skilled are not explained or detailed herein.

Regarding coherent noise attenuation techniques that may be applied to seismic data processing, they include ground/mud roll attenuation. This technique may use information from non-aliased low-frequency data to help attenuate high-frequency aliased noise. Another technique is demultiple, i.e., the attenuation or removal of those waves that suffer multiple reflections before being recorded. The demultiple technique includes a class of various methods, with some of them briefly discussed now. Gapped deconvolution is one member of the class and relies on time-domain operators that are derived and applied to remove multiples in the time or tau-p domain. Gapped deconvolution may be applied on LF and HF data separately or on the combination of LF and HF data. Radon demultiple is another member of the demultiple class, and it may include high resolution Radon. Least squares Radon is often applied to frequency slices independently and may be applied to LF and HF data separately. High-resolution Radon normally calculates sparseness weights on low-frequency non-aliased data to prevent aliasing in the Radon domain at high temporal frequencies. If two seismic data sets are used, it is possible to derive sparseness weights from LF data and use the weights to prevent aliasing on the HF data. Another member of the class is surface-related multiple attenuation (SRME). This is a convolution and summation process which may be applied to LF and HF data independently. Other members of the demultiple class include wave propagation demultiple, internal multiple attenuation (IME), etc.

Another technique for coherent noise attenuation is interference noise attenuation. Amongst other strategies, this technique may consist of impulsive denoise in the time or tau-p domain. As described before, this will be effective with application on the LF and HF data independently. Still another technique for coherent noise attenuation is shear wave attenuation. Those skilled in the art would appreciate that other noise attenuation methods and techniques may exist, and those discussed above were exemplary and not intended to be a complete list.

The method then advances to step 408, which deghosts the seismic data sets, if they are marine data sets. In some cases, the processes of deghosting and data regularization (to be discussed next) may be combined. Data regularization is performed in step 410, and it implies regularizing the seismic data beyond aliasing. To achieve this goal, model representations of the seismic data using information from LF data propagated to HF data are commonly used. Step 410 is discussed later in more detail.

In step 412, the velocity model is built. Velocity model building is applied after data regularization, and this step may be applied as per conventional data. For full waveform inversion (FWD, a cost function may be defined to jointly match the LF and HF data (this is a similar discussion to least squares RTM given later in the application).

In step 414, the processed seismic data is used to generate an image of the surveyed subsurface. Imaging may take various shapes, e.g., Kirchhoff, beam migration, wave equation, e.g., RTM, least squares migration, etc. This step is discussed later in more detail.

In step 416, post-migration processing may be applied. This processing may include interpolation (e.g., FX interpolation). FX interpolation uses operators calculated at low frequencies to interpolate high-frequency data. While after migration the LF and HF data will be co-located, this process may be applied before data regularization by deriving prediction filters on the LF data and using them for interpolation of the HF data. Another post-migration process is random noise attenuation, which is often applied on frequency slices. This process may be applied to HF and LF data separately. Still another process is Q-compensation, which is often applied on frequency slices. This process may be applied to HF and LF data separately. Another process is frequency filtering, which is applied on frequency slices. This process also may be applied to HF and LF data separately.

As discussed above, some of the steps (e.g., frequency filtering) may be applied to the low- and high-frequency data independently, but other processes use energy at one temporal frequency to process data at another temporal frequency (e.g., Radon demultiple). Many processing steps use low temporal frequency information to guide results on high frequencies. Often, these steps relate to cases where the input data is aliased. Some examples of these steps known in the literature are as follows:

Interpolation/Regularization
  a. Interpolation in the FX domain; e.g., Spitz method
    i. Spitz, S. [1991] Seismic trace interpolation in the F-X domain: *Geophysics*, 56 (6), 785-794.
  b. Regularization using plane event extraction
    i. Hugonnet, P. and Boelle, J. L. [2007] Beyond aliasing regularisation by plan event extraction, EAGE conference proceedings.
  c. Guided anti-leakage Fourier transform
    i. Schonewille, M., Klaedtke, A. and Vigner, A. [2009] Anti-alias anti-leakage Fourier transform. 79*th SEG Annual Meeting*, Houston Expanded Abstracts.
  d. Minimum weighted norm interpolation
    i. Trad, D. [2009] Five-dimensional interpolation: Recovering from acquisition constraints: *Geophysics*, 74, no. 6, V123-V132.
  e. Curvelets
    i. Hennenfent, G. and Herrmann, F. [2005] Sparseness-constrained data continuation with frames: Applications to missing traces and aliased signals in 2/3-D, SEG conference proceedings.
    ii. Naghizadeh, M. and Sacchi, M. D. [2010a] Beyond alias hierarchical scale curvelet interpolation of regularly and irregularly sampled seismic data: *Geophysics*, 75.

Noise attenuation (attenuation of either coherent or random noise)
  f. Radon demultiple (coherent noise attenuation)
    i. Herrmann, P. et al., [2000] De-aliased, high-resolution Radon transforms: 70th Annual International Meeting, SEG, Expanded Abstracts, 1953-1956.
    ii. Hugonnet, P. et al., [2008] 3D High Resolution parabolic Radon filtering: 70th Annual International Meeting, SEG, Expanded Abstracts, 27, no. 1, 2492-2496.
    iii. Trad, D. et al., [2003] Latest views of the sparse Radon transform, *Geophysics*, 68, 386-399.

Traditional wisdom when dealing with any of the above steps, for two or more seismic data sets recorded with the same spatial sampling, is to (1) calculate a model domain representation of the seismic data for low frequencies and (2) to use the low-frequency model to constrain the model representation for high frequencies (e.g., for dealiasing). An alternative approach is to (1) calculate a filter at low frequencies and (2) use the filter to process the high frequencies (e.g., interpolation or denoise techniques).

However, the above-noted procedures require that the low-frequency and high-frequency data are sampled consistently in space. Thus, according to an embodiment, the high- and low-frequency data are considered to not be consistently sampled in space. If this is the case, new methods are discussed for processing seismic data sets having different spatial sampling to obtain an image of the surveyed subsurface.

In this respect, the more accurate the image, the better the chances of drilling at the correct location and of finding oil and gas reservoirs with a reduced extraction price. Thus, the embodiments to be discussed next improve the technological processes of finding and extracting oil and gas by combining two seismic data sets recorded with different spatial sampling and different temporal bandwidths.

One such embodiment is now discussed with regard to Radon demultiple, which is a component of step 406 of noise attenuation. As described in the art, parabolic Radon demultiple may be problematic due to spatial aliasing of data at high temporal frequencies. For this reason, it is common to use a low-frequency parabolic Radon model domain to guide the model derivation for high frequencies. In the event there is a difference in spatial positioning between low- and high-frequency data, the traditional scheme fails to produce accurate results.

Figure 5:
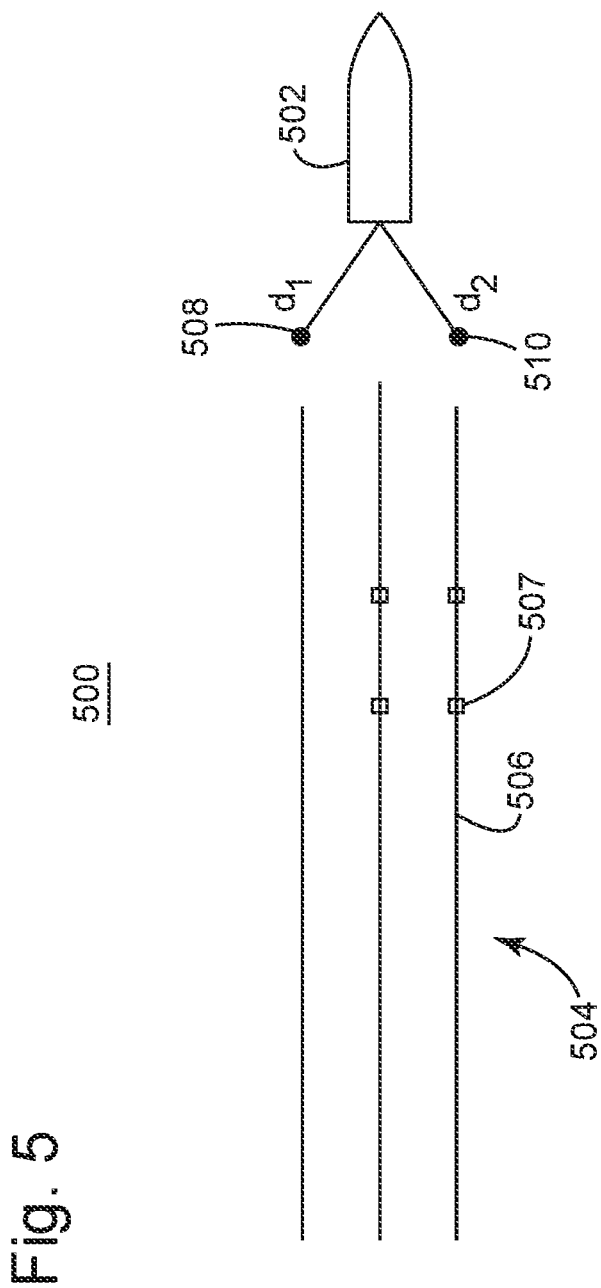
FIG. 5 schematically illustrates a marine seismic acquisition system having two sources.

To rectify this problem, consider low- and high-frequency seismic data sets relating to two seismic sources d1 and d2, respectively, as illustrated in FIG. 5. FIG. 5 shows a seismic acquisition system 500 that includes at least a vessel 502 that tows a streamer spread 504. Streamer spread 504 includes at least one streamer 506 having one or more types of seismic sensors 507 (only four are shown for simplicity), e.g., hydrophones, geophones, accelerometers, etc. Vessel 502 may tow the two sources d1 508 and d2 510. Each source may be a source array that includes one or more source elements. As discussed above, the source element may be vibratory, impulsive, etc. Seismic data (low- and high-frequency) generated by the sources and recorded by the seismic sensors may be recorded during the same seismic survey. In one application, the two data sets may be recorded during two different seismic surveys, as is the case for a 4D survey.

Also consider that sources d1 and d2 are in relatively close proximity to each other, e.g., having a 50 m or less cross-line separation. Source d1 may be configured to generate high-frequency signals (e.g., 20 to 100 Hz) while source d2 may be configured to generate low-frequency signals (e.g., 1 to 20 Hz).

Figure 6:
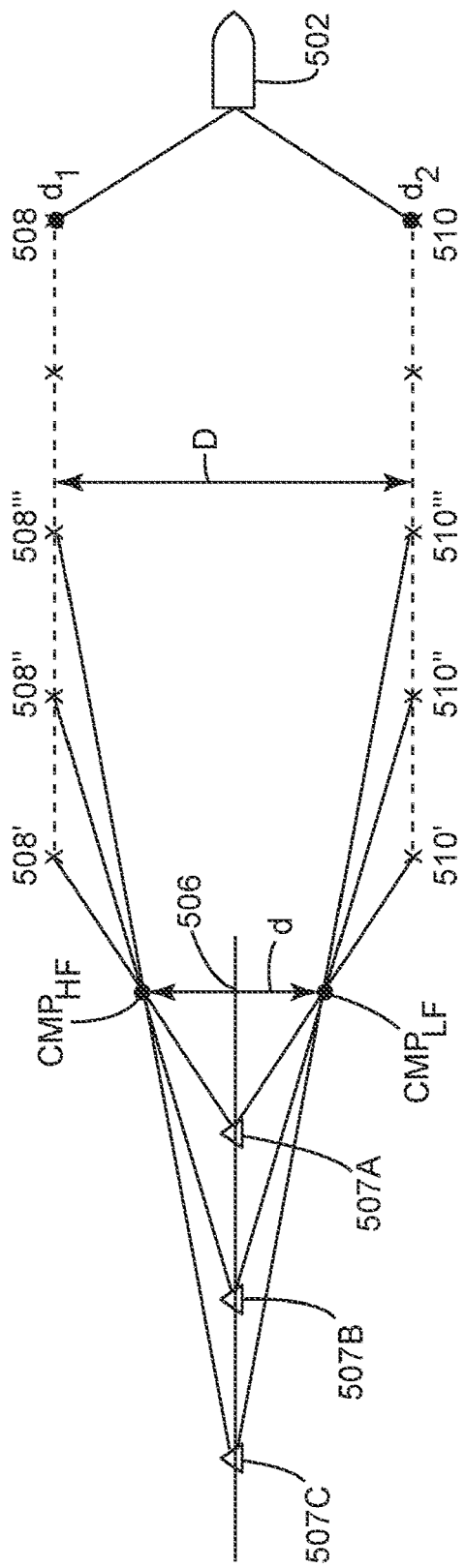
FIG. 6 illustrates consecutive shots and corresponding common midpoint gathers.

It is common in data processing to sort the recorded data to 2D common midpoint gathers (CMPs), where traces are grouped based on a position located along a line between the source and receiver. FIG. 6 illustrates three consecutive shots 508', 508" and 508'" for high-frequency source 508, three consecutive shots 510', 510" and 510'" for low-frequency source 510, and three seismic receivers 507A-C distributed along streamer 506. Note that the three high-frequency shots recorded by receivers 507A-C, although recorded at different instants, correspond to the same CMP gather, i.e., $CMP_{HF}$. The same is true for low-frequency CMP gather $CMP_{LF}$.

FIG. 6 shows that lateral displacement d between $CMP_{LF}$ and $CMP_{HF}$ is half the source separation D. Because low-frequency energy generally varies spatially more slowly than high-frequency energy (e.g., Fresnel zone), and assuming that sources d1 and d2 are sufficiently close together, the inventor of this application has discovered that it is possible to use the energy from low-frequency source d2 510 to guide the Radon transform for high-frequency source d1 508, although the two types of energies were recorded with different spatial sampling.

To confirm this novel feature, CMP gathers are collected consistently from two sources in a configuration as shown in FIG. 6. In this case, each source 508 and 510 is a source array composed of plural air guns, and each source emits broadband data, i.e., both low and high frequencies. This choice offers the possibility to compare Radon demultiple results obtained by using (i) low-frequency energy from source 510 to guide the high-frequency energy from source 508, and (ii) low-frequency energy from source 508 to guide the high-frequency energy from source 510, thus testing the above novel assertion.

Figure 7:
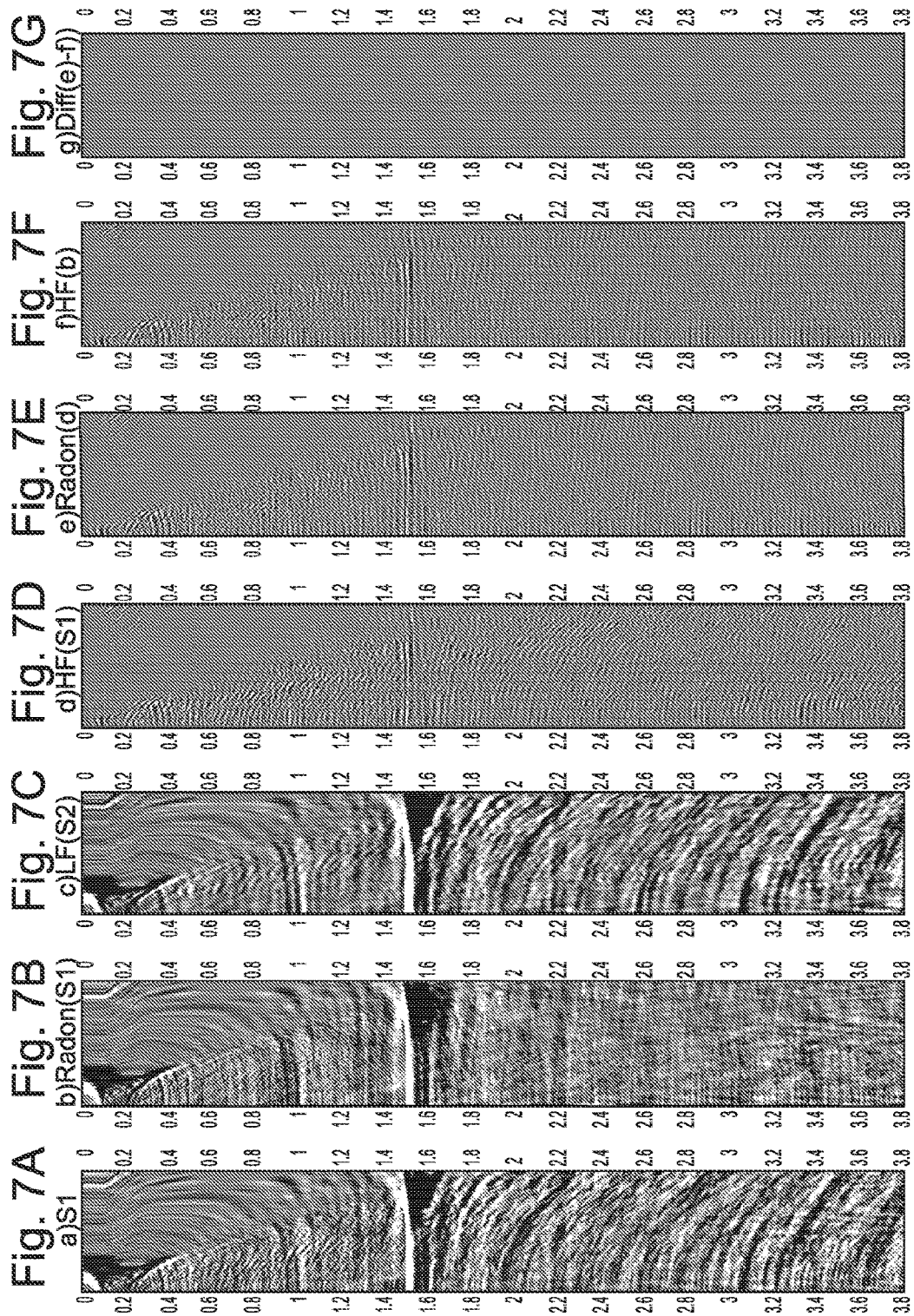
FIGS. 7A-G show low- and high-frequency data from two sources.
Figure 8:
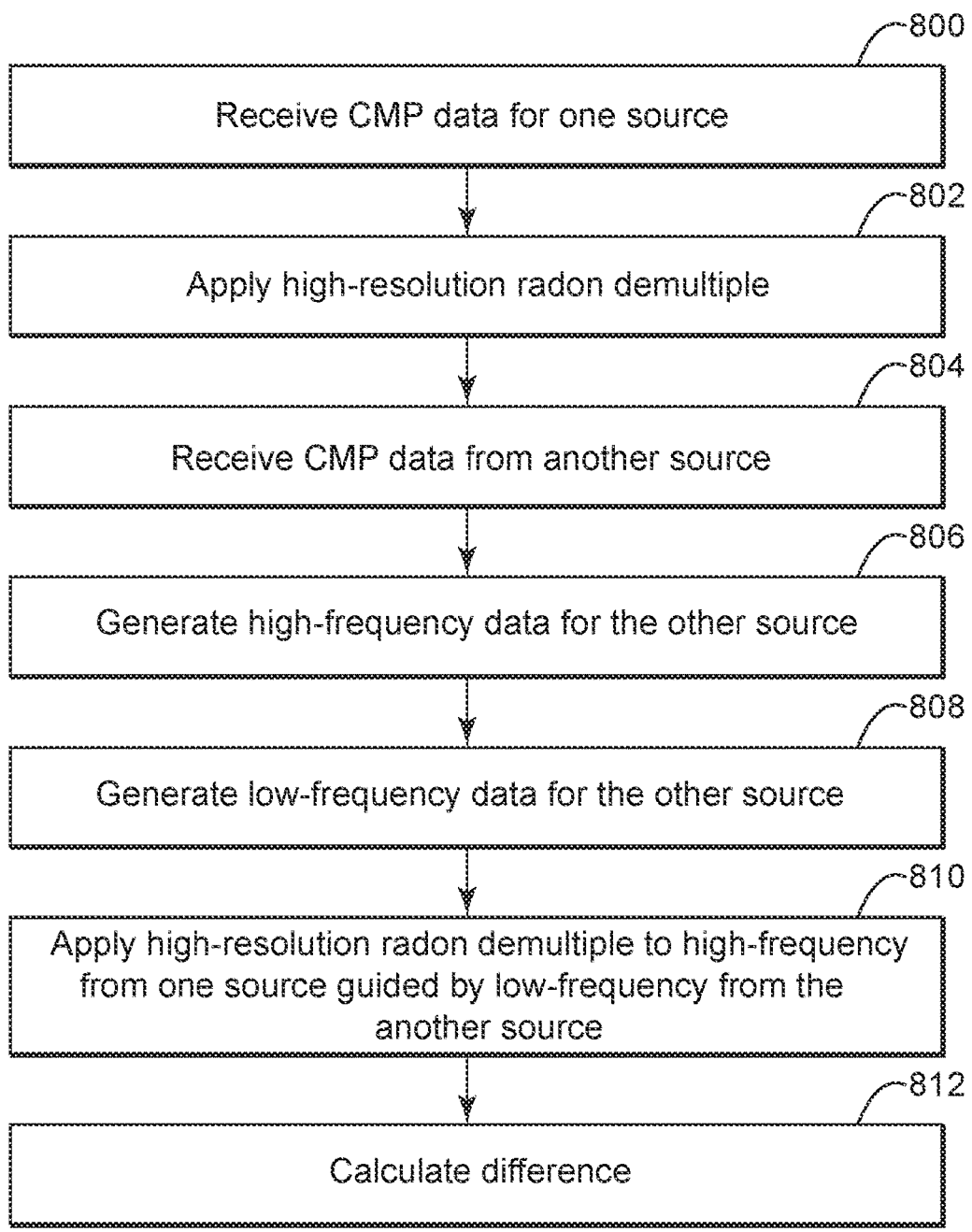
FIG. 8 is a flowchart of a method for calculating demultiples based on two seismic data having different spatial sampling.

The proposed test follows the flow illustrated in FIG. 8. FIG. 8 shows that in step 800, CMP data for source 510 is received. This data is illustrated in FIG. 7A. In step 802, a high-resolution Radon demultiple method is applied to source 510's CMP using low-frequency data to guide the transform derivation of high-frequency data. All data is used from source 510. The result of the high-resolution Radon demultiple method is illustrated in FIG. 7B.

In step 804, the CMP data from source 508 is received. In step 806, the CMP data from source 510 is low-cut at, for example, 25 Hz, to generate the high-frequency data (see FIG. 7D), and in step 808, the CMP data from source 508 is high-cut at, for example, 25 Hz, to generate the low-frequency data (see FIG. 7C). A high-resolution Radon demultiple method is applied in step 810 to high-frequency data shown in FIG. 7D, where the low-frequency data shown in FIG. 7C is used to guide the high-frequency data of FIG. 7D. The results of the demultiple are shown in FIG. 7E. To compare the same results for the case illustrated in FIG. 7B, i.e., both the low- and high-frequency data received from source 510, the demultiples illustrated in FIG. 7B are low-cut at 25 Hz to generate the high-frequency result, which is illustrated in FIG. 7F. A difference calculated between the data illustrated in FIG. 7E (i.e., high-frequency data from source 510 guided with low-frequency data from source 508, which represents the different spatial sampling case) and the data illustrated in FIG. 7F (i.e., high-frequency data from source 510 guided with low-frequency data from source 510, which represents the same spatial sampling case) is calculated in step 812 and it is shown in FIG. 7G. FIG. 7G illustrates the minimal difference between the results of FIGS. 7E and 7F, which validates the novel feature that seismic data sets of different spatial sampling may be used together for processing.

Thus, the results in FIGS. 7A-G illustrate a similar effectiveness of high-frequency demultiple, whether the low frequencies for one source (FIG. 7E) or the other source (FIG. 7F) are used to guide the transform at high frequencies. The low amplitude difference illustrated in FIG. 7G highlights the strength of this approach. While the above method is an example of a high-resolution Radon demultiple, the use of low-frequency data to guide the processing of high-frequency data is relevant for other applications using a model space, as discussed later in this application.

Another embodiment is now discussed with regard to tau-p deconvolution, which is an implementation of gapped deconvolution. Gapped deconvolution has been discussed above with regard to FIG. 4, step 406, which is linked to noise attenuation. Gapped deconvolution in the tau-p domain is a robust and effective method to attenuate multiples in shallow water or land environments. The method includes the following steps: (1) forward tau-p transform the recorded seismic data, (2) apply gapped deconvolution in the tau-p domain based on the multiple lag, and (3) reverse tau-p transform the processed data to obtain the seismic data in the time-space domain. This method is proven to work for two or more seismic data sets that were recorded with same spatial sampling. However, for the case of different spatial sampling for low- and high-frequency data, the tau-p model may be designed with a linear inversion so that when the reverse tau-p transform is applied, it simultaneously satisfies both low- and high-frequency data.

In other words, for standard linear Radon, the step of deriving the tau-p model may consist of solving the following linear equation:

$$d=Lp, \quad (1)$$

where "d" is the input data for one frequency slice in the temporal-frequency domain, "p" is the tau-p model, and "L" is a reverse slant matrix. Matrix L may be defined as:

$$L_{m,n}=e^{2\pi i f h_m s_n}, \quad (2)$$

where "$h_m$" is the offset (i.e., distance between source and receiver) of input trace "m," and "$s_n$" is the slowness of the p-trace "n." Equation (2) may be adapted so that data d may be defined to contain both LF and HF data for frequencies contained in both data, e.g., $$\begin{pmatrix} HF_1 \\ LF_1 \\ LF_2 \end{pmatrix} = \begin{pmatrix} e^{2\pi i fp_1 h_{HF_1}} & e^{2\pi i fp_2 h_{HF_1}} & e^{2\pi i fp_3 h_{HF_1}} & e^{2\pi i fp_4 h_{HF_1}} \\ e^{2\pi i fp_1 h_{LF_1}} & e^{2\pi i fp_2 h_{LF_1}} & e^{2\pi i fp_3 h_{LF_1}} & e^{2\pi i fp_4 h_{LF_1}} \\ e^{2\pi i fp_1 h_{LF_2}} & e^{2\pi i fp_2 h_{LF_2}} & e^{2\pi i fp_3 h_{LF_2}} & e^{2\pi i fp_4 h_{LF_2}} \end{pmatrix} \begin{pmatrix} p_1 \\ p_2 \\ p_3 \\ p_4 \end{pmatrix}, \quad (3)$$

where the tau-p model p simultaneously represents the LF and HF data. The equations may be solved in the frequency domain (for example when there is an overlap in the frequency content of LF and HF) or in the time domain.

Once the tau-p domain has been calculated, deconvolution may be applied, followed by the multiple model being reverse transformed back to the offset-time domain for obtaining the low- and high-frequency seismic data sets.

Other options may include applying the process to LF and HF data independently, or combining the LF and HF data (e.g., sum) first and then applying the process to the combined data. The summing of data with different spatial positions may involve selecting the nearest LF trace to each HF trace and summing them together. An LF trace may be summed with more than one HF trace. The data may be subsequently separated.

Figure 10A:
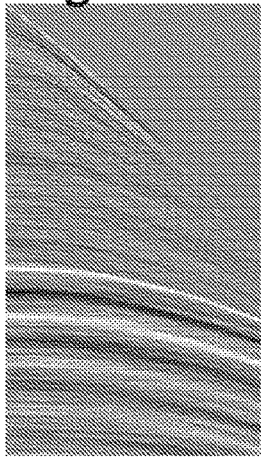
FIGS. 10A-J illustrate low-frequency and high-frequency data processed according to gapping deconvolution.

A case of tau-p deconvolution in the shot domain with LF and HF sources as shown in FIG. 5 is now discussed to illustrate this method. FIG. 9 is a flowchart of a method for applying gapping deconvolution. In step 900, two seismic data sets are received, one from source d1 and the other one from source d2. Each set of seismic data includes both LF and HF data. The data from source d1 is illustrated in FIG. 10A and the seismic data from source d2 is illustrated in FIG. 10B. FIG. 10C illustrates the HF data from source d1 and the LF data from source d2, where a 25 Hz frequency was used for the low-cut and high-cut of the full data from each source.

Figure 10D:
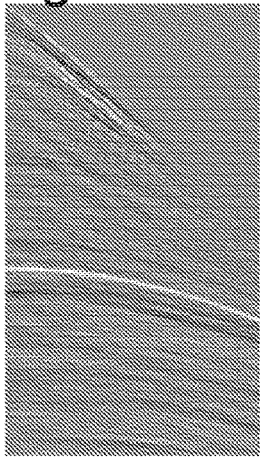
Figure 10J:
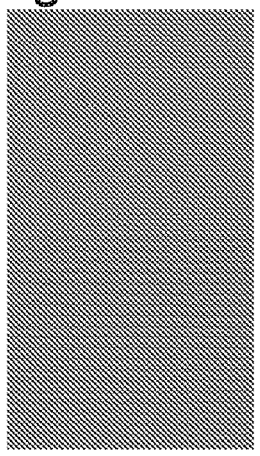
Figure 10B:
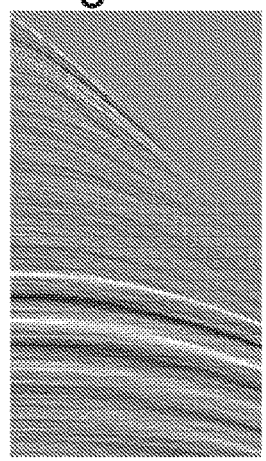
Figure 10E:
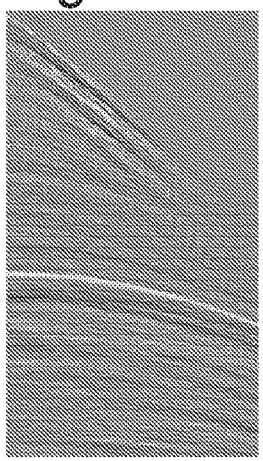
Figure 10I:
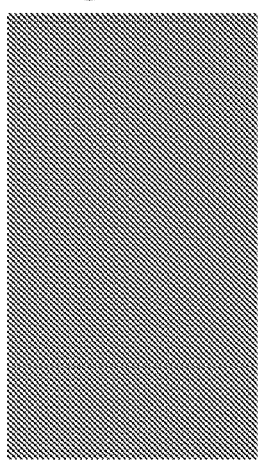
Figure 10C:
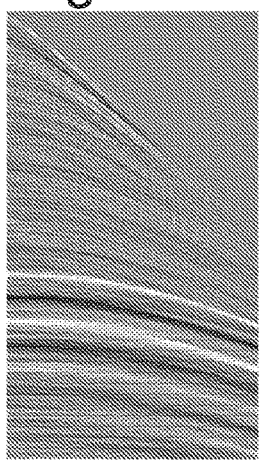
Figure 10F:

In step 902, the tau-p deconvolution based on equations (2) and (3) is applied to (a) the full data received from source d1, the results of which are illustrated in FIG. 10D, (b) the full data received from source d2, the results of which are illustrated in FIG. 10E, and (c) the combined data (i.e., HF data from source d1 and LF data from source d2 as illustrated in FIG. 10C, with the two data sets recorded with different spatial sampling), the results of which are illustrated in FIG. 10F.

Figure 10G:
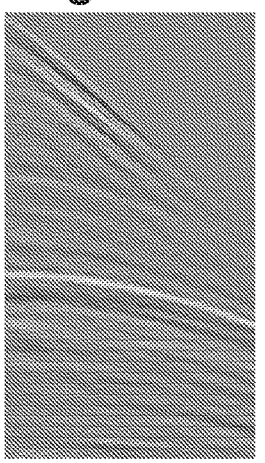
Figure 10H:
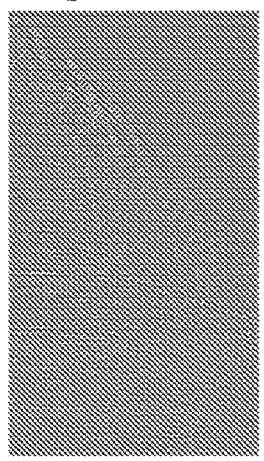

In step 904, the LF data (see FIG. 10G) is separated from the HF data (see FIG. 10H), for the combined tau-p deconvolved data illustrated in FIG. 10F. Then, to perform the comparison of the deconvolved combined data, which includes different spatial sampling, the LF data shown in FIG. 10G is subtracted in step 906 from the LF data corresponding to the deconvolved full data of source d2 (see Figure E), resulting in the residual shown in FIG. 10I. Similarly, the HF data shown in FIG. 10H is subtracted in step 908 from the HF data corresponding to the deconvolved full data of source d1 (see FIG. 10D), resulting in the residual shown in FIG. 10J.

The consistent demultiple results of FIGS. 10D-F, along with low amplitude differences in FIGS. 10I and 10J, confirm the equivalence of the tau-p deconvolution demultiple results of the combined data set illustrated in FIG. 10C compared to the independent data sets illustrated in FIGS. 10A and 10B.

Figure 11:
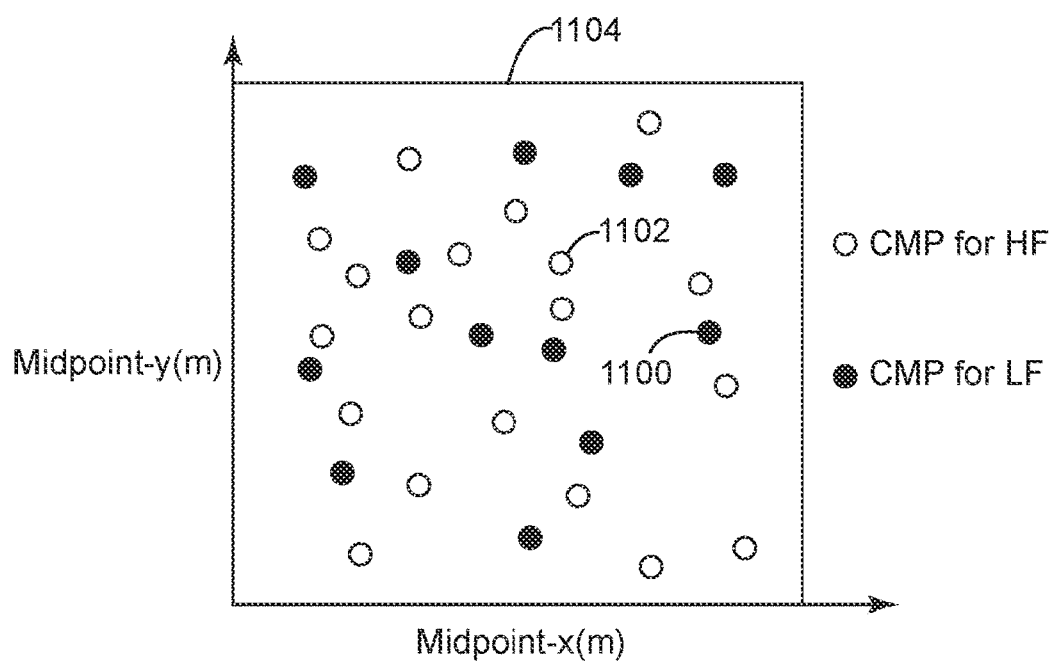
FIG. 11 illustrates two sets of seismic data having different spatial sampling in the offset-volume domain.

Another embodiment is now discussed with regard to data regularization. A traditional method is 3D data regularization using a guided anti-leakage Fourier transform (see for more details, Xu et al., [2005] Anti-leakage Fourier transform for seismic data regularization, *Geophysics*, 70, 87-95). This particular method of the Anti-leakage Fourier transform (ALFT) algorithm uses a low-frequency model of the data to define the wavenumber decomposition order for the higher temporal frequencies. However, this method was designed to work for low- and high-frequency data recorded with the same spatial sampling. In this embodiment, the modified version of the algorithm uses low-frequency data that may come (at least partially) from traces which have different spatial positioning to the high-frequency data. For example, it is possible to use the same acquisition scenario as in the embodiment illustrated in FIG. 6. For the present embodiment, the data is considered in the offset-volume domain, within a spatial window in the midpoint-x and midpoint-y directions, as illustrated in FIG. 11. The midpoint-x and the midpoint-y coordinates shown in FIG. 11 correspond to the coordinates of those points located at mid-distances between the source and the receiver. FIG. 11 shows low-frequency CMP 1100 and high-frequency CMP 1102. Note that FIG. 11 indicates the different spatial sampling of the low- and high-frequency data.

In practice, it may be possible to have coarser sampling for the low-frequency data compared to the high-frequency data. The two data sets 1100 and 1102 both satisfactorily cover the same spatial area 1104. A novel regularization scheme for such data sets is now discussed with regard to FIG. 12.

Figure 12:
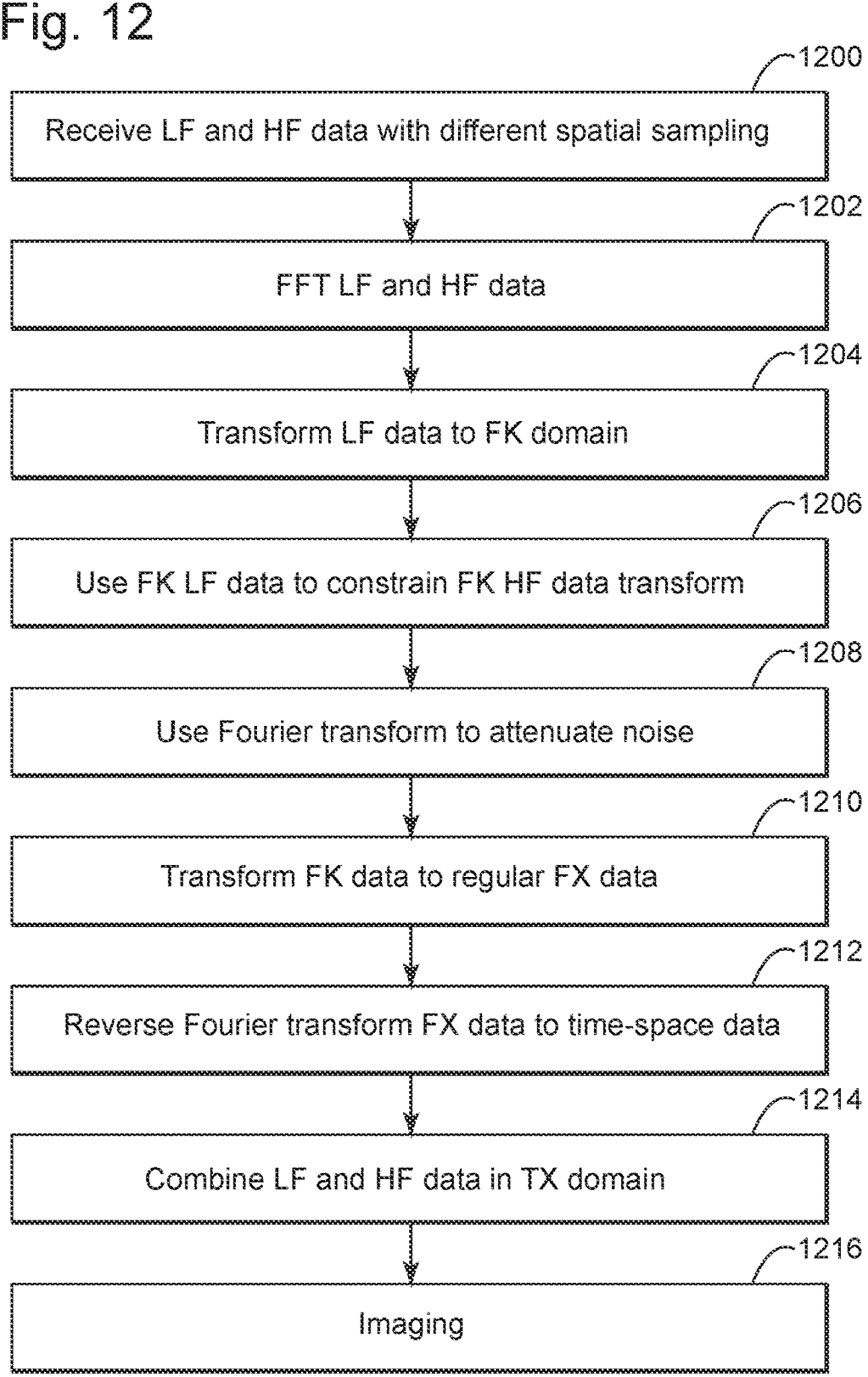
FIG. 12 is a flowchart of a regularization method of seismic data sets having different spatial sampling.

The method illustrated in FIG. 12 has a step 1200 of receiving HF and LF data recorded in the time-space domain, i.e., HF(t,x,y) and LF(t,x,y). In step 1202, a Fast Fourier transform (FFT) is applied to the HF and LF data in the time-space domain, such that the HF(t,x,y) data is transformed into HF(f,x,y) in the frequency-space domain, and the LF(t,x,y) data is transformed into LF(f,x,y) in the frequency-space domain.

In step 1204, the irregular spatial Fourier transform for the LF data in the frequency-space domain is calculated, i.e., LF(f,x,y) is transformed to LF(f,kx,ky) in the frequency-wavenumber domain. In step 1206, the output LF(f,kx,ky) from step 1204 is used to constrain the spatial Fourier transform for the HF data, i.e., to constrain the transformation of HF(f,x,y) to HF(f,kx,ky). In step 1208, the Fourier transform of step 1206 may optionally be used to attenuate noise (either random or coherent) as scaling.

In step 1210, the spatial Fourier transform of HF and LF data may be used to generate data at new spatial positions. These spatial positions may be regularly sampled (e.g., at the center of a bin grid) or irregularly sampled (e.g., at the position of midpoints from a different data set). For example, the spatial Fourier transform may act on LF(f,kx,ky) in the frequency-wavenumber domain to obtain LF(f,x,y) in the frequency-space domain and similarly transform HF(f,kx,ky) to HF(f,x,y).

In step 1212, the data may be reverse Fourier transformed to the time-space domain, e.g., from LF(f,x,y) to LF(t,x,y) and from HF(f,x,y) to HF(t,x,y). If the output positions for HF and LF are consistent, then it is possible to combine in step 1214 the data to form a data set covering the full bandwidth relating to HF and LF, e.g., F(x,y,t)=LF(x,y,t)+HF(x,y,t). In the case that there is a frequency overlap of the two data sets, a normalization weighting in the overlap zone may be required. Finally, in step 1216, existing processing techniques may be applied to generate an image of the surveyed subsurface. Note that this embodiment uses Fourier transforms to manipulate the data. Those skilled in the art would know that other transforms and/or combination of transforms may be used to achieve the same results.

With regard to step 1204, it may include a weighted summation to derive each wavenumber, as given by equation (4)

$$K_{jk} = \sum_{l} w_l e^{2\pi i (x_l K_j + y_l K_k)}, \tag{4}$$

where wavenumbers in the x and y direction are given by $K_j$ and $K_k$, and the input traces have positions $x_l$ and $y_l$. The weights $w_l$ may be defined based on the Voronoi weighting and normalized to 1.

With regard to step 1206, in one application, the data from step 1204 is used to estimate energy amplitude at different dips for the spatio-temporal window. This may be achieved by mapping the $FK_xK_y$ domain to the $Fp_xp_y$ domain and summing the amplitudes in frequency. Once this estimate has been made, it may be propagated to all frequencies and used to derive the decomposition order for the anti-leakage transform.

Figures 13A, 13B, 13C, 13D, 13E, 13F:
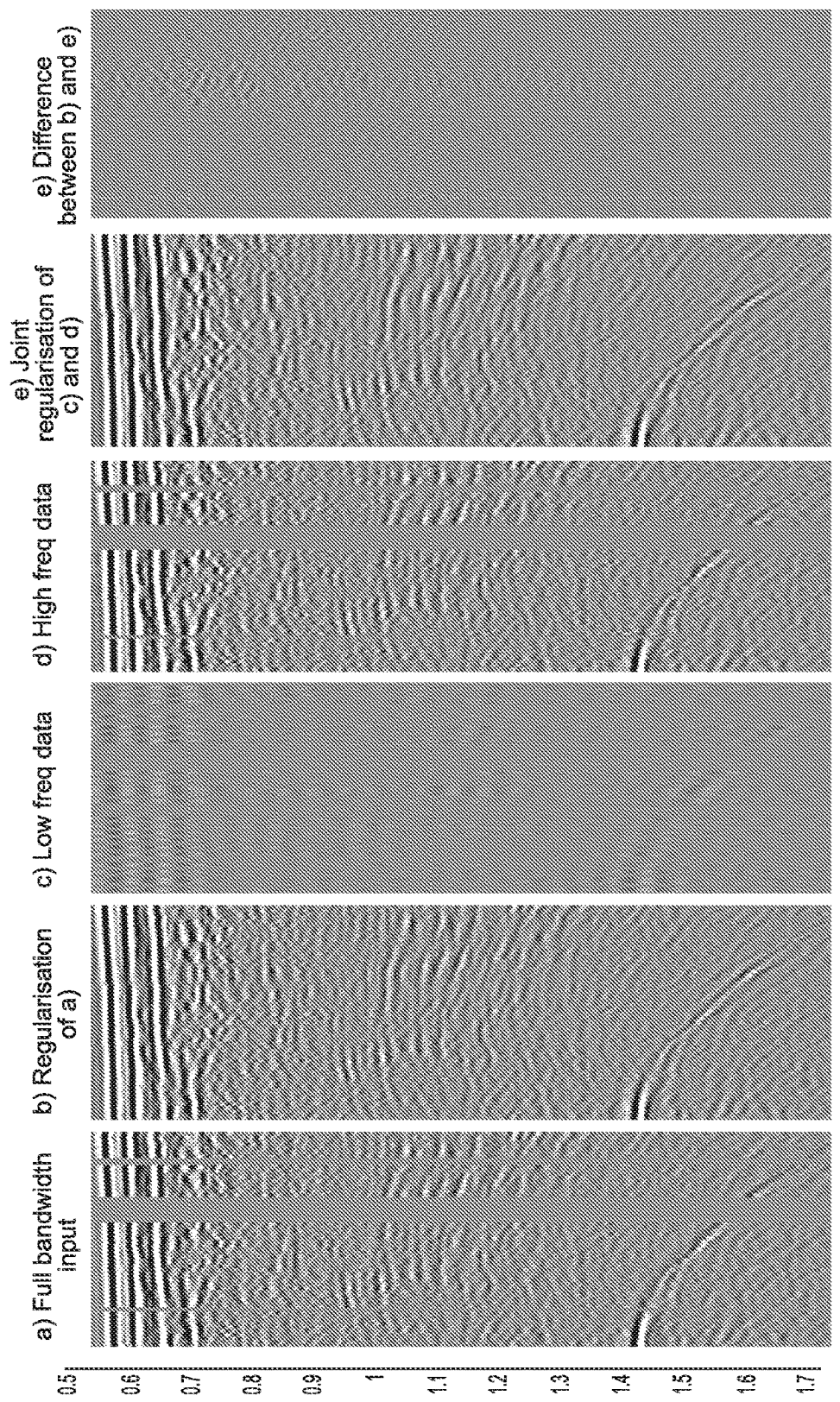
FIGS. 13A-F illustrate a practical example of regularization using seismic data sets having different spatial sampling.

The method described in the flowchart of FIG. 12 is now illustrated by using seismic data recorded with a dual-source towed streamer acquisition, similar to the embodiment illustrated in FIG. 6. The data is in the common offset domain. The full bandwidth input data is illustrated in FIG. 13A. Using regular processing, the data is regularized as illustrated in FIG. 13B. This would be the reference data to be compared with the regularized data using the method illustrated in FIG. 12. When applying the method of FIG. 12, HF and LF data having different spatial sampling is used. This data is created as follows: the energy below 25 Hz is zero for the port source to obtain the HF data having one spatial sampling (see FIG. 13D); the starboard source data below 25 Hz is extracted to obtain the LF data having a different spatial sampling (see FIG. 13C). The HF data is then regularized using the LF data, i.e., the starboard source data below 25 Hz, to regularize the HF data above 25 Hz data for both starboard and port sources, as illustrated in FIG. 13E. The difference between the reference regularized data of FIG. 13B and the novel regularization scheme of FIG. 13E is shown in FIG. 13F. It can be seen that the difference is relatively minor.

This is true because, while in theory the results from the second regularization will not be as good as the first, in fact there is a negligible difference between the results. This is because low-frequency energy varies spatially very slowly. Therefore, even though low-frequency data is sampled more coarsely than high-frequency data, it is still sufficient as a guide for high-frequency regularization.

The previous embodiment related to 3D regularization. However, the method discussed above with regard to FIG. 12 is also applicable to regularization in higher dimensions (e.g., mid-x, mid-y, offset, azimuth, time, etc.). Further, although the ALFT algorithm was described in this embodiment, other schemes of deriving a model may be used, e.g., inversion, which derives a model to satisfy the input data with I2, I1, Cauchy, or other norm. Sparseness weights may be updated iteratively, e.g., iteratively re-weighted least squares. Sparseness weights from one or both data sets may be used to stabilize the inversion. In the case of inversion approaches, a model domain should be derived to simultaneously satisfy LF and HF data on their respective positions in a similar way to equation (3) given in the tau-p deconvolution section. The scheme may be applied in a frequency domain (Fourier, Laplace, Z-transform or other) or in the time domain.

Various model domains may be used for noise attenuation and/or data interpolation in the schemes previously discussed. Some examples of model domains are:
Tau-p domain
FK domain
Curvelet domain
Parabolic domain
Hyperbolic domain
Image domain (for least-squares migration)

Higher dimensional transforms using a single type or combination of types of the above-noted transforms are also possible.

While the above discussion has related to using LF to help build a dealiased model of HF, the energy used for a guide may not come exclusively from the LF data as described above. Likewise, the guide may not necessarily be used exclusively to derive the model for the HF. In fact, the guide may be derived partly from LF and partly from HF data, and may subsequently be used to derive the model for LF and/or HF data. Alternatively, the guide may be derived from LF, but used for model derivation of LF and/or HF.

As previously discussed in this application, two seismic data sets having different spatial sampling may be applied to the imaging methods. A few of these imaging methods are now discussed. In general, the traditional approach is to combine LF and HF data before migration and to migrate the combined data as per conventional data. However, according to the embodiments next discussed, the LF and HF datasets could be migrated separately and combined after migration. While the input sampling to the migration may be at different positions, the output data will be co-located and can be summed. Some of these alternative approaches are outlined below.

Kirchhoff migration (either time or depth domain), from a simplistic point of view, may be considered to include a step of travel-time calculation from a velocity estimate of the subsurface, a step of applying a migration operator including anti-alias filtering as necessary, and a step of applying the migration operator to the input data. Given an accurate velocity model, constructive and destructive interference of the migration operator results in an accurately positioned representation of the subsurface. Because the Kirchhoff operator is orthogonal in the temporal frequency sense, it is a valid approach to migrate the LF data and HF data separately and sum the migration results. A variation to the above-noted scheme would be to apply appropriate low/high-cut filtering to the LF and HF data so that when they are combined, there is no undesirable effect at the cross-over frequency between the LF and HF data.

In one embodiment, instead of migrating LF and HF data separately, it is possible, and sometimes beneficial, to regularize both data to the same sampling before migration, as discussed previously with regard to FIG. 12.

If beam migration is considered, it consists of deriving slant stack representations of common-midpoint spatial window data in the common offset (or common offset-x/offset-y) volumes. While the HF and LF data may be combined prior to imaging with data regularization as discussed above with regard to FIG. 12, it is also possible to combine HF and LF data during the step of forming the slant stack data representation prior to migration. This approach may consist of pre-processing LF and HF data to avoid cross-over frequency issues (e.g., scaling energy at a given frequency which has contributions from each dataset so that it is consistent with a source emission with flat amplitude spectrum), followed by the step of slant stack. The spatial sampling of LF and HF data may be different, resulting in different normalization in the slant stack procedure for LF and HF data.

Still another imaging process is based on the wave-equation migration (e.g., one-way or reverse time migration). Wave equation migration consists of a source wave field (beginning with the source signature) and a receiver wave field (the one recorded by the receiver). These wave fields are propagated in time and cross-correlated to make the output image through use of an imaging condition (e.g., cross-correlation).

FIGS. 14A-I schematically illustrate the wave-equation migration process using two data sets of different spatial sampling. A one-way wave equation source wave field 1400 (see FIG. 14A) is being forward-propagated into the subsurface and the receiver wave field 1402, 1404 (see FIG. 14B) is being backward-propagated back into the subsurface. When energy correlates in the source and receiver wave fields, the cross-correlation adds energy 1410 into the output image (see FIG. 14C). Note that FIG. 14B shows two curves 1402 and 1404 that correspond to detected events reflected from two subsurface layers. For this simple case, there are two horizontal reflectors at 500 m and 1000 m depth, and the wave fields are considered at depth zero, the depth of the first reflector, and the depth of the second reflector. It can be seen that at 500 m depth, recorded energy 1412 relating to the first reflector in FIG. 14E coincides with the energy 1414 in FIG. 14D of the source, giving a strong correlation 1416 in FIG. 14F. At the depth of the second reflector (FIGS. 14G-I), the energy 1420 of the second arrival in FIG. 14H coincides with the source wave field 1418 in FIG. 14G, resulting in a strong correlation 1422 in FIG. 14I.

The process may be repeated for all the gathers in the data set, the result from each being summed to generate the final image. In the case that the LF and HF data relate to sources of different bandwidths, they may be migrated independently and combined post-migration as in the discussion for Kirchhoff migration.

In the case that the HF and LF data relate to different receiver types, the data may be migrated in the receiver domain. Alternatively, after cross-over frequency correction, the data for both LF and HF receivers may be propagated and imaged simultaneously.

The above scheme may be modified to cover the case where more than one source is simultaneously excited. This embodiment is illustrated in FIGS. 15A-I. FIG. 15A shows two source wave fields 1500 and 1502 leaving the surface simultaneously and interfering at 1504. This arrangement generates two pairs of reflectors on the receiver side, as illustrated by fields 1510, 1512, 1514 and 1516 in FIG. 15B. Even though the receiver wave field is now more complex, there is still an exact match at the reflector depth as before, as illustrated by energies 1520 and 1522 in FIGS. 15F and I. The only problem with this scheme relates to interference between the two sources, e.g., where energies 1510 and 1514 overlap with energies 1512 and 1516 in FIGS. 15E and 15H.

The analysis presented with regard to this embodiment may be extended to cover the case where the second source is excited with a delay relative to the first. This example is shown in FIGS. 16A-I. FIG. 16A illustrates the time delay between shooting the first and second sources. While the timing of the events has changed, there is still consistency in timing between the source and receiver sides at the depths of the reflectors, as illustrated by energies 1620 and 1622, corresponding to the two reflectors at 500 and 1000 m depth.

According to another embodiment, in the case of moving sources emitting energy continuously or semi-continuously (e.g., marine vibrators or de-synchronised air gun source), FIGS. 15A to 16I may be modified to be based on continuous recording time rather than listening time. This is essentially a simultaneous shooting scenario where energy relating to earlier times overlaps with energy relating to later times, following their propagation through the subsurface. In this regard, FIG. 17A shows the source data and FIG. 17B shows the receiver data based on surface datum. In this case, the source and receiver data have been mapped on to a regular grid using spatial interpolation (e.g., sinc). The gray area 1700 in FIG. 17A highlights the zone of interference based on the direct arrival of the moving source.

Figures 18A, 18B:
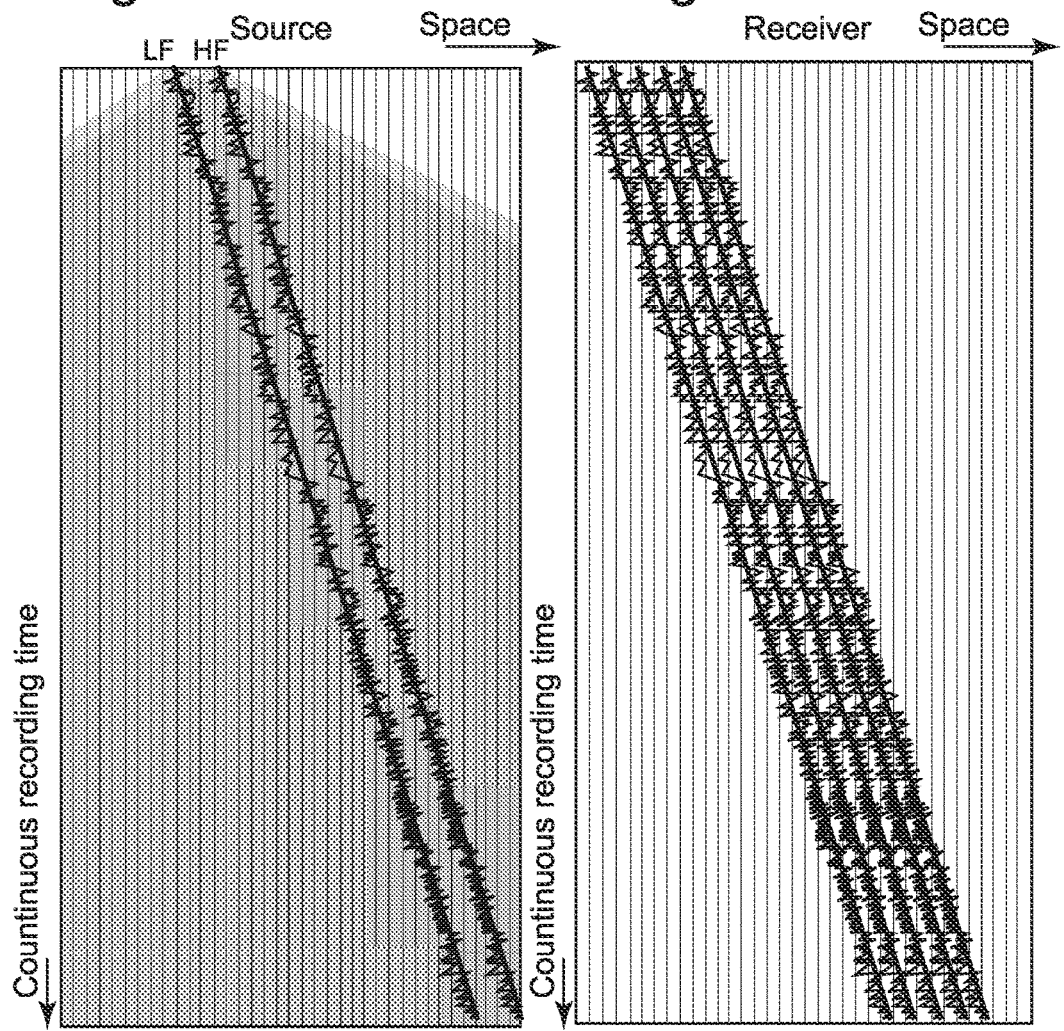
FIGS. 18A-B illustrate source and receiver data, respectively, in the case of moving sources emitting energy continuously or semi-continuously.

FIG. 17A illustrates a source emitting a random signal while moving and FIG. 17B illustrates four receivers continuously recording while moving behind a vessel. Instead of a given listening time, e.g., 8 seconds, a continuous recording time, e.g., 7 hours, is used in this embodiment while the vessel travels for the whole line of a 3D acquisition. Instead of migrating many independent shots and summing the results together, the method propagates the wave fields based on continuous recording time and derives an image for the whole sail line in one go. According to this method, a lot of interference is expected to occur, but if a pseudo-random or pseudo-orthogonal signal is used, the interference should not cause problems for the imaging condition. The above-noted method may be extended to the case where more than one source with continuous emission is used, as illustrated in FIGS. 18A-B.

While the examples discussed above with regard to FIGS. 14A to 18B relate to one-way wave equation migration, the same principle may be used for other schemes, e.g., RTM (reverse time migration). While the above example was in 2D, the same principle extends to 3D (e.g., narrow, wide, multi-azimuth, etc.).

According to another embodiment, seismic data sets having different spatial sampling may be used with a least squares migration method. One aim of a traditional least squares migration is to derive a migrated image of seismic data so that when reverse migrated, it matches the input data (e.g., in a least squares sense). This traditional principle may apply to all types of migration (e.g., Kirchhoff, beam or wave equation). An example of traditional least squares RTM may be found in Zhang, Y., and Duan, L. [2013] A stable and practical implementation of least-squares reverse time migration, SEG conference proceedings. The migration algorithm may be designed to migrate primary energy, multiples, or a combination of the two.

Figure 19:
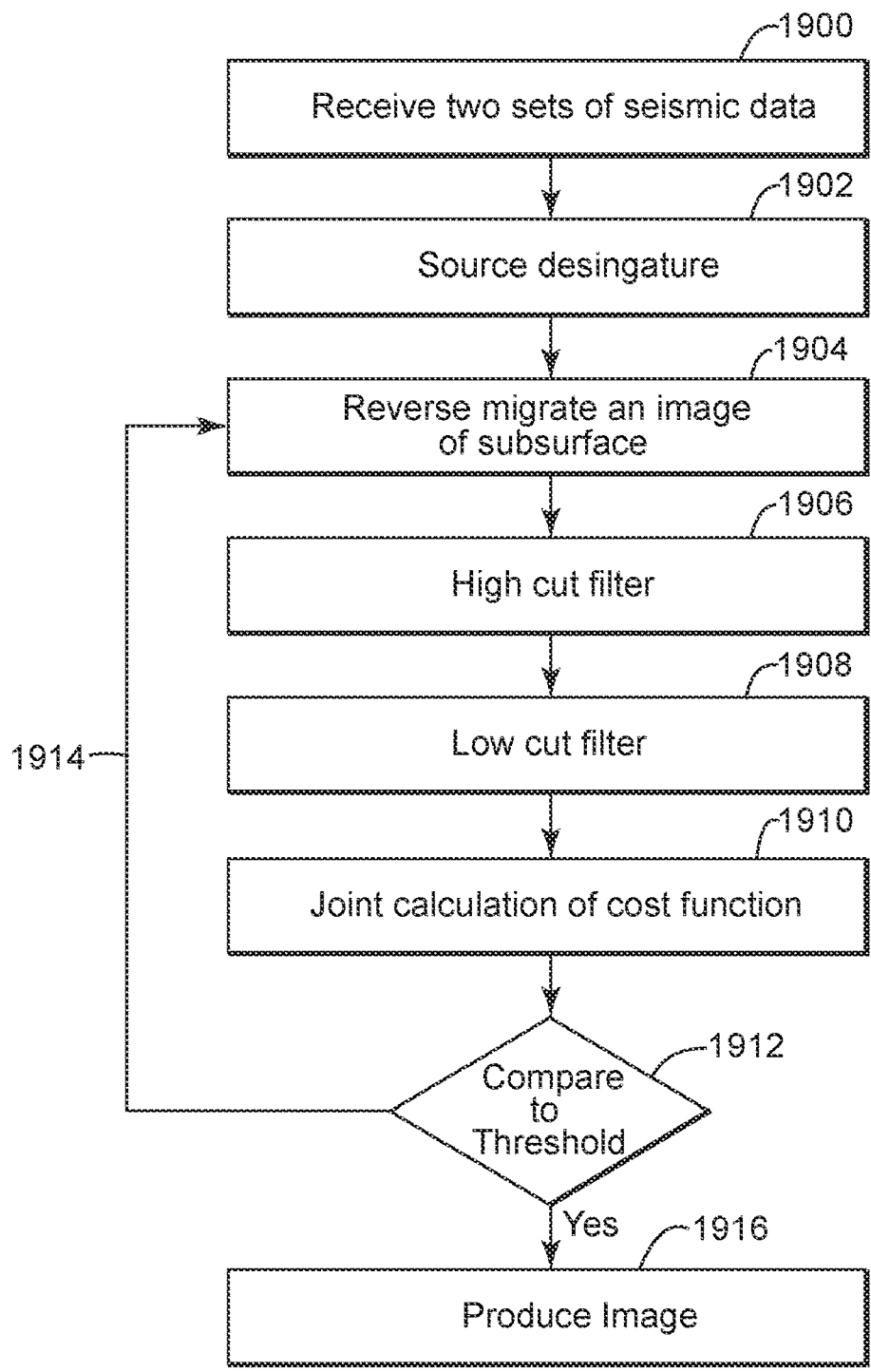
FIG. 19 is a flowchart of a method illustrating a migration process that uses two seismic data sets having different spatial sampling.

In the case of seismic data having different bandwidths and/or positioning, according to an embodiment, it is possible to define a novel least squares migration problem as follows: derive a subsurface image so that when reverse migrated, it satisfies the LF data for the LF bandwidth, and it also satisfies the HF data for the HF bandwidth. In practical terms, as illustrated in FIG. 19, two seismic data sets are received in step 1900, and this seismic data is pre-processed in step 1902 for source designature. In step 1904, the method reverse migrates an image of the subsurface to generate data in the time domain ($s_x$, $s_y$, $r_x$, $r_y$, t) for all recorded data positions. The image may be calculated by a previous iteration of the method as discussed later or it may be based on one of the models discussed above. In one embodiment, the image is selected based on the experience of the operator or based on previous surveys of the subsurface. In step 1906, the method applies a high-cut filter to the seismic data relating to the positions of the LF data, and in step 1908 the method applies a low-cut filter to the data relating to the positions of the HF data.

In step 1910, a cost function (e.g., the sum of squares of the difference between modeled and recorded energy) is jointly calculated based on the difference between the LF data of step 1906 and the HF data of step 1908. The cost function may have various configurations as will be appreciated by those skilled in the art. Then, in step 1912 the method compares the result of the cost function with a given threshold. If the result of the comparison is above the threshold, the method returns in step 1914 to update the migration image selected in step 1904 and, in an iterative fashion, recalculates another image until the image which represents the input data as accurately as possible. When this process is performed, the method generates in step 1916 an image of the subsurface.

In the case that the HF and LF data contain source signature effects, steps 1906 and 1908 may be modified to include convolution with the source wavelet. This convolution may be 1 D, 2D or 3D.

In the case that a blended acquisition using HF and LF sources has been used, the modeled HF and LF data (steps 1906 and 1908) after convolution with the relevant signatures may be combined (e.g., summed). The input data for this scheme may be based on continuous recording time or listening plus source signature time (listening time may be defined as the time for all useful reflected signals to have been recorded).

This approach is relevant for continuous source emission or "sweep then listen" acquisition. In the case of continuous emission, this means that an image needs to be found which, when reverse migrated based on the moving source and receiver positions, reproduces the input data in the same format as FIGS. 17A-B as accurately as possible.

Figure 20:
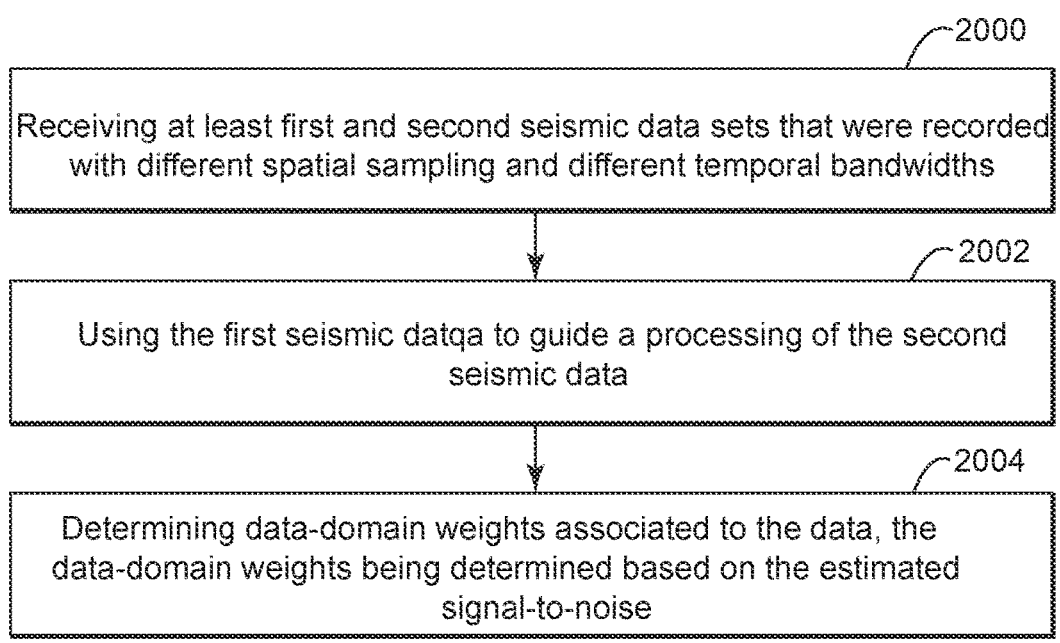
FIG. 20 is a flowchart of a method for processing two seismic data sets having different spatial sampling.

The above-discussed embodiments illustrated how to process two seismic data sets having different spatial sampling for various processing steps, e.g., noise removal, data regularization, imaging, etc. Based on any of the above-discussed embodiments, a method for processing seismic data associated with a surveyed subsurface, is now discussed with reference to FIG. 20. The method includes a step 2000 of receiving at least first and second seismic data sets that were recorded with different spatial sampling and different temporal bandwidths, a step 2002 of using the first seismic data to guide a processing of the second seismic data, and a step 2004 of generating an image of the subsurface based on processed second seismic data.

According to another embodiment, there is a method for processing seismic data associated with a surveyed subsurface. The method includes a step of receiving at least first and second seismic data sets that were recorded with different spatial sampling and different temporal bandwidths, a step of interpolating the first seismic data to positions of the second seismic data to obtain interpolated first seismic data, a step of combining the interpolated first seismic data with the second seismic data, and a step of generating an image of the subsurface based on a combination of the interpolated first seismic data with the second seismic data.

The different temporal bandwidths of the first and second seismic data sets relate to low-frequency data and high-frequency data. In one embodiment, the first and second seismic data sets relate to energy generated by a vibrating source that operates on land or water. The combination of the interpolated first seismic data and the second seismic data may be output on a regular grid or an irregular grid.

To summarize the above discussed embodiments, it is possible to use the multiple datasets as follows:
1) Simply combine a recorded HF trace with the nearest LF trace (i.e., sum or weighted sum) for all the traces in the datasets; or
2) Reconstruct (i.e., interpolate) LF data to a spatial position closer to the HF data and then combine the two datasets; or
3) Use LF data to help denoise HF data, e.g., remove multiples, attenuate interference noise, attenuate random noise, etc.; or
4) Use LF data to constrain processing of HF data (e.g., sparseness weights, decomposition order, etc.); or
5) Derive a model representation which jointly satisfies traces from both datasets; or
6) Ultimately create an image of the subsurface based on both datasets using one or more of methods 1) to 5) or other discussed above.

Figure 21:
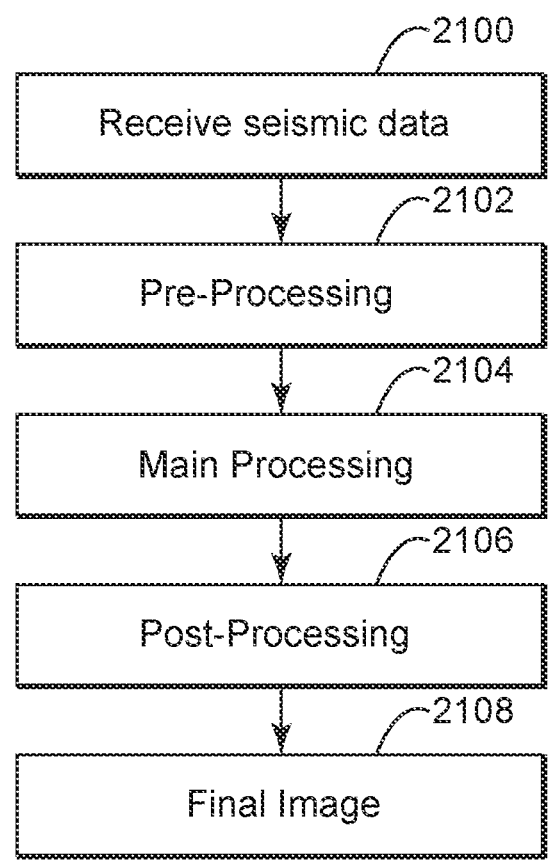
FIG. 21 is a flowchart of a method for processing seismic data.

Seismic data recorded with different spatial sampling and/or different temporal bandwidths as discussed above may be processed in a corresponding processing device for generating an image of the surveyed subsurface as discussed now with regard to FIG. 21. For example, the seismic data collected with the characteristic noted above may be received in step 2100 at the processing device. In step 2102, pre-processing methods are applied, e.g., demultiple, signature deconvolution, trace summing, motion correction, vibroseis correlation, resampling, etc. In step 2104, the main processing takes place, e.g., deconvolution, amplitude analysis, statics determination, common middle point gathering, velocity analysis, normal move-out correction, muting, trace equalization, stacking, noise rejection, amplitude equalization, etc., as discussed in the previous embodiments. In step 2106, final or post-processing methods are applied, e.g., migration, wavelet processing, seismic attribute estimation, inversion, etc., and in step 2108 the final image of the subsurface is generated. Note that at least one process in one of steps 2106 and/or 2108 involves dealing with two or more seismic data sets having different spatial sampling and different temporal bandwidths. Also note that a result of this processing may result in an improvement of the image of the surveyed subsurface. The improved image quality will result in an increased likelihood of finding the oil and gas reservoirs.

Figure 22:
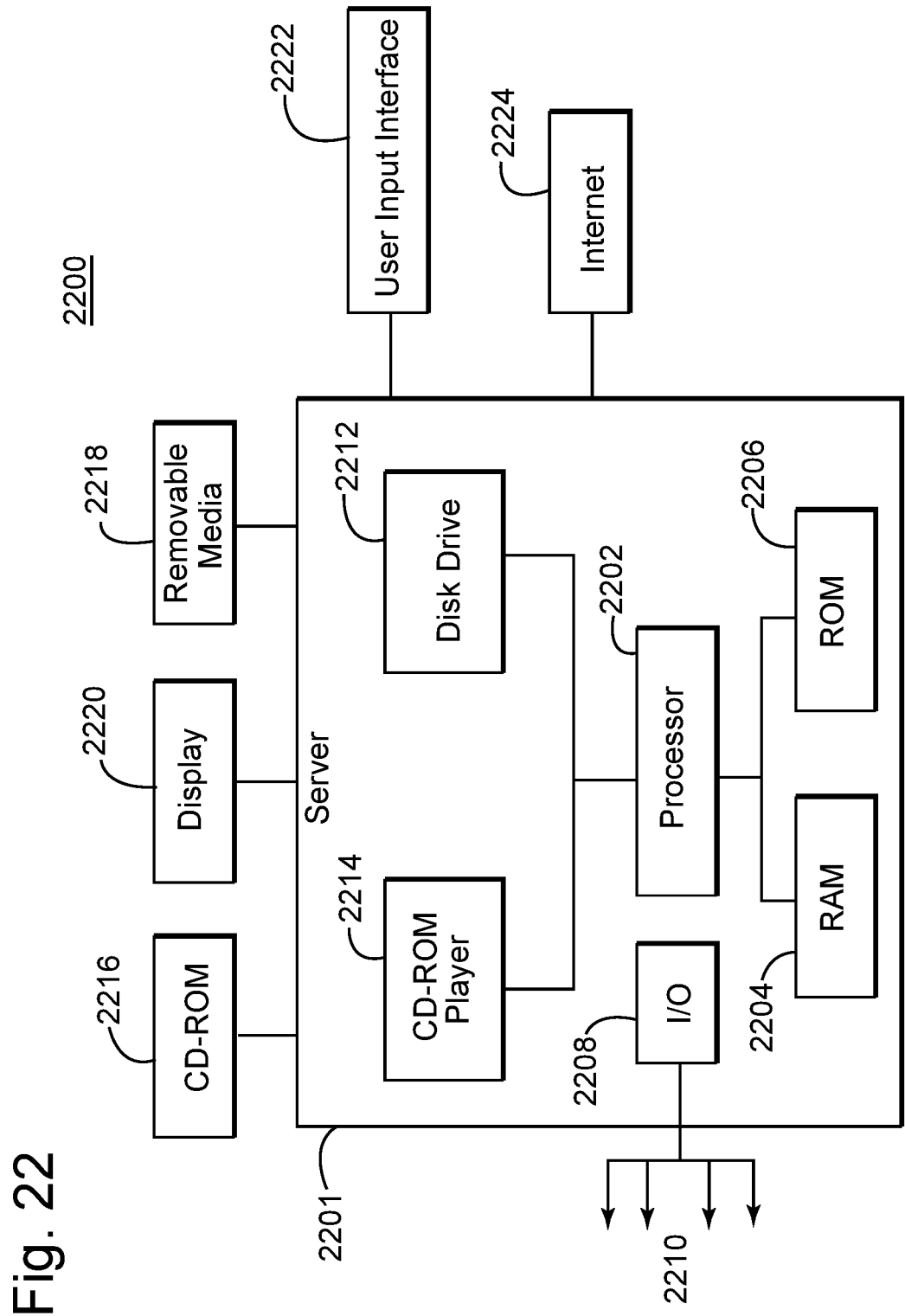
FIG. 22 is a schematic illustrating of a computing device on which any of the above methods may be implemented.

An example of a representative processing (or control) device capable of carrying out operations in accordance with the embodiments discussed above is illustrated in FIG. 22. Hardware, firmware, software or a combination thereof may be used to perform the various steps and operations described herein. The processing device 2200 of FIG. 22 is an exemplary computing structure that may implement any of the processes and methods discussed above or combinations of them.

The exemplary processing device 2200 suitable for performing the activities described in the exemplary embodiments may include server 2201. Such a server 2201 may include a central processor unit (CPU) 2202 coupled to a random access memory (RAM) 2204 and/or to a read-only memory (ROM) 2206. ROM 2206 may also be other types of storage media to store programs, such as programmable ROM (PROM), erasable PROM (EPROM), etc. Processor 2202 may communicate with other internal and external components through input/output (I/O) circuitry 2208 and bussing 2210 to provide control signals and the like. For example, processor 2202 may communicate with appropriate valves of the source elements for controlling the air pressure inside each source element. Processor 2202 carries out a variety of functions as are known in the art, as dictated by software and/or firmware instructions.

Server 2201 may also include one or more data storage devices, including disk drives 2212, CD-ROM drives 2214, and other hardware capable of reading and/or storing information, such as a DVD, etc. In one embodiment, software for carrying out the above-discussed steps may be stored and distributed on a CD-ROM 2216, removable media 2218 or other form of media capable of storing information. The storage media may be inserted into, and read by, devices such as the CD-ROM drive 2214, disk drive 2212, etc. Server 2201 may be coupled to a display 2220, which may be any type of known display or presentation screen, such as LCD, plasma displays, cathode ray tubes (CRT), etc. A user input interface 2222 is provided, including one or more user interface mechanisms such as a mouse, keyboard, microphone, touchpad, touch screen, voice-recognition system, etc.

Server 2201 may be coupled to other computing devices, such as the equipment of a vessel, via a network. The server may be part of a larger network configuration as in a global area network (GAN) such as the Internet 2228, which allows ultimate connection to various landline and/or mobile client/watcher devices.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer-readable medium may be utilized, including hard disks, CD-ROMs, digital versatile discs (DVD), optical storage devices or magnetic storage devices such a floppy disk or magnetic tape. Other non-limiting examples of computer-readable media include flash-type memories or other known types of memories.

The disclosed exemplary embodiments provide a device and method for processing two seismic data sets having different spatial sampling and/or different temporal bandwidths. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for processing seismic data associated with a surveyed subsurface, the method comprising:
   receiving at least first and second seismic data sets that were recorded with different spatial sampling and different temporal bandwidths;
   using the first seismic data to guide a processing of the second seismic data; and
   generating an image of the subsurface based on processed second seismic data.

2. The method of claim 1, wherein the different temporal bandwidths of the first and second seismic data sets relate to low-frequency data and high-frequency data.

3. The method of claim 1, wherein the first and second seismic data sets relate to energy generated by a vibrating source that operates on land or water.

4. The method of claim 1, further comprising:
   deriving a model which simultaneously satisfies the first and second seismic data sets; and
   generating the image based on the model.

5. The method of claim 1, wherein the first and second seismic data sets are recorded during a same seismic survey.

6. The method of claim 1, wherein the first and second seismic data sets are recorded by seismic sensors configured to be sensitive to the different temporal bandwidths.

7. The method of claim 1, wherein the first and second data are acquired simultaneously.

8. The method of claim 1, wherein the first and second data sets are acquired independent of each other.

9. The method of claim 1, wherein the step of using the first seismic data to guide the processing of the second seismic data comprises:
   generating a model for the surveyed subsurface based on the first seismic data set, which include low frequencies, to dealias a model for the second seismic data set, which include high frequencies.

10. The method of claim 9, wherein the model for the second seismic data set is used to remove noise or to interpolate data.

11. The method of claim 1, wherein the different temporal bandwidths relate to bandwidths overlapping by less than half of the bandwidth in octaves emitted by a source.

12. A computing device for processing seismic data associated with a surveyed subsurface, the computing device comprising:
    an interface configured to receive at least first and second seismic data sets that were recorded with different spatial sampling and different temporal bandwidths; and
    a processor connected to the interface and configured to use the first seismic data to guide a processing of the second seismic data, and to generate an image of the subsurface based on processed second seismic data.

13. The computing device of claim 12, wherein the different temporal bandwidths of the first and second seismic data sets relate to low-frequency data and high-frequency data.

14. The computing device of claim 12, wherein the first and second seismic data sets relate to energy generated by a vibrating source that operates on land or water.

15. The computing device of claim 12, wherein the processor is further configured to:
    derive a model which simultaneously satisfies the first and second seismic data sets; and
    generate the image based on the model.

16. A method for processing seismic data associated with a surveyed subsurface, the method comprising:
    receiving at least first and second seismic data sets that were recorded with different spatial sampling and different temporal bandwidths;
    interpolating the first seismic data to positions of the second seismic data to obtain interpolated first seismic data;
    combining the interpolated first seismic data with the second seismic data; and
    generating an image of the subsurface based on a combination of the interpolated first seismic data with the second seismic data.

17. The method of claim 16, wherein the different temporal bandwidths of the first and second seismic data sets relate to low-frequency data and high-frequency data.

18. The method of claim 16, wherein the first and second seismic data sets relate to energy generated by a vibrating source that operates on land or water.

19. The method of claim 16, wherein the combination of the interpolated first seismic data and the second seismic data is output on a regular grid.

20. The method of claim 16, wherein the combination of the interpolated first seismic data and the second seismic data is output on an irregular grid.

* * * * *